United States Patent
Yukawa et al.

(10) Patent No.: US 11,072,209 B2
(45) Date of Patent: Jul. 27, 2021

(54) PNEUMATIC TIRE WITH SEALANT LAYER AND AT LEAST ONE RESONATOR, AND METHOD FOR PRODUCING SAME

(71) Applicant: SUMITOMO RUBBER INDUSTRIES, LTD., Kobe (JP)

(72) Inventors: Naoki Yukawa, Kobe (JP); Mutsuki Sugimoto, Kobe (JP); Satoshi Yamada, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 982 days.

(21) Appl. No.: 15/516,615

(22) PCT Filed: Oct. 16, 2015

(86) PCT No.: PCT/JP2015/079284
§ 371 (c)(1),
(2) Date: Apr. 3, 2017

(87) PCT Pub. No.: WO2016/060234
PCT Pub. Date: Apr. 21, 2016

(65) Prior Publication Data
US 2017/0305210 A1    Oct. 26, 2017

(30) Foreign Application Priority Data
Oct. 17, 2014    (JP) .............................. JP2014-212950

(51) Int. Cl.
*B60C 19/12*    (2006.01)
*B60C 19/00*    (2006.01)
(Continued)

(52) U.S. Cl.
CPC .......... *B60C 19/002* (2013.01); *B29C 73/163* (2013.01); *B29D 30/0061* (2013.01);
(Continued)

(58) Field of Classification Search
CPC . B60C 19/002; B60C 19/122; B60C 11/1353; B60C 19/12
See application file for complete search history.

(56) References Cited

U.S. PATENT DOCUMENTS

| | | | |
|---|---|---|---|
| 4,115,172 A | 9/1978 | Baboff et al. | |
| 4,398,583 A | 8/1983 | Casey | |

(Continued)

FOREIGN PATENT DOCUMENTS

| | | |
|---|---|---|
| CN | 102950974 A | 3/2013 |
| EP | 0080968 A2 | 6/1983 |

(Continued)

OTHER PUBLICATIONS

English machine translation of JP 2009-227167 A, Oct. 8, 2009.*
(Continued)

*Primary Examiner* — Adrienne C. Johnstone
(74) *Attorney, Agent, or Firm* — Birch, Stewart, Kolasch & Birch, LLP

(57) ABSTRACT

A pneumatic tire includes a resonator attached to the inner periphery of the tire, the resonator including a tube with an opening, and a cavity connected to the tube. The pneumatic tire further includes s a tread portion and each resonator faces the tread portion, the tread portion includes at least one circumferential longitudinal groove, and the opening is provided to penetrate a circumferential longitudinal groove of the tread portion.

10 Claims, 8 Drawing Sheets

(51) Int. Cl.
- *B60C 11/13* (2006.01)
- *B29D 30/06* (2006.01)
- *B29D 30/00* (2006.01)
- *B29C 73/16* (2006.01)
- *C08L 23/22* (2006.01)
- *B60C 9/04* (2006.01)
- *B60C 9/00* (2006.01)
- *B60C 5/14* (2006.01)

(52) U.S. Cl.
CPC ...... *B29D 30/0685* (2013.01); *B60C 11/1353* (2013.01); *B60C 19/12* (2013.01); *B60C 19/122* (2013.01); *C08L 23/22* (2013.01); *B29D 30/0681* (2013.01); *B29D 2030/0686* (2013.01); *B29D 2030/0694* (2013.01); *B29D 2030/0697* (2013.01); *B60C 5/14* (2013.01); *B60C 9/0007* (2013.01); *B60C 2009/0441* (2013.01); *B60C 2009/0466* (2013.01); *C08L 2203/162* (2013.01); *C08L 2205/025* (2013.01); *C08L 2205/03* (2013.01); *Y10T 152/10684* (2015.01)

(56) References Cited

U.S. PATENT DOCUMENTS

| | | |
|---|---|---|
| 5,711,904 A | 1/1998 | Eswaran et al. |
| 2010/0218883 A1 | 9/2010 | Naito |
| 2010/0307655 A1 | 12/2010 | Tanno |
| 2013/0048180 A1 | 2/2013 | Song |
| 2014/0014248 A1 | 1/2014 | Parfondry et al. |
| 2015/0107743 A1 | 4/2015 | Seong |

FOREIGN PATENT DOCUMENTS

| | | |
|---|---|---|
| EP | 0302400 A1 | 2/1989 |
| EP | 2562009 A2 | 2/2013 |
| JP | 50-27067 A | 3/1975 |
| JP | 52-145904 A | 12/1977 |
| JP | 52-148544 A | 12/1977 |
| JP | 53-16203 A | 2/1978 |
| JP | 53-60002 A | 5/1978 |
| JP | 53-138111 A | 12/1978 |
| JP | 54-9805 A | 1/1979 |
| JP | 55-37322 A | 3/1980 |
| JP | 55-127212 A | 10/1980 |
| JP | 56-34509 A | 4/1981 |
| JP | 57-42753 A | 3/1982 |
| JP | 58-93612 A | 6/1983 |
| JP | 59-15442 A | 1/1984 |
| JP | 1-113483 A | 5/1989 |
| JP | 4-226741 A | 8/1992 |
| JP | 6-183207 A | 7/1994 |
| JP | 9-155950 A | 6/1997 |
| JP | 11-291363 A | 10/1999 |
| JP | 2001-18609 A | 1/2001 |
| JP | 2002-36813 A | 2/2002 |
| JP | 2002-205512 A | 7/2002 |
| JP | 2002-347136 A | 12/2002 |
| JP | 2002-347418 A | 12/2002 |
| JP | 2003-512478 A | 4/2003 |
| JP | 2003-305781 A | 10/2003 |
| JP | 2004-168212 A | 6/2004 |
| JP | 2004-299379 A | 10/2004 |
| JP | 2005-254551 A | 9/2005 |
| JP | 2006-181566 A | 7/2006 |
| JP | 2007-76290 A | 3/2007 |
| JP | 2007-99162 A | 4/2007 |
| JP | 2008-500915 A | 1/2008 |
| JP | 2008-149714 A | 7/2008 |
| JP | 2008-213418 A | 9/2008 |
| JP | 2008-255168 A | 10/2008 |
| JP | 2008-307749 A | 12/2008 |
| JP | 2009-191106 A | 8/2009 |
| JP | 2009227167 A * | 10/2009 |
| JP | 2010-42695 A | 2/2010 |
| JP | 2010-528131 A | 8/2010 |
| JP | 2010-234707 A | 10/2010 |
| JP | 2010-280340 A | 12/2010 |
| JP | 2011-20479 A | 2/2011 |
| JP | 2011-143680 A | 7/2011 |
| JP | 2012-183656 A | 9/2012 |
| JP | 2013-43643 A | 3/2013 |
| JP | 2013-147243 A | 8/2013 |
| KR | 10-1430052 B1 | 8/2014 |
| WO | WO 02/087904 A1 | 11/2002 |
| WO | WO 2009/014082 A1 | 1/2009 |
| WO | WO 2012/090311 A1 | 7/2012 |
| WO | WO-2016/104663 A1 * | 6/2016 |

OTHER PUBLICATIONS

Machine Translation of JP-2004-168212-A, published Jun. 17, 2004 (Japanese and English language versions provided).

Machine Translation of JP-2010-42695-A, published Feb. 25, 2010 (Japanese and English language versions provided).

\* cited by examiner (a)

(b)

PNEUMATIC TIRE WITH SEALANT LAYER AND AT LEAST ONE RESONATOR, AND METHOD FOR PRODUCING SAME

TECHNICAL FIELD

The present invention relates to a pneumatic tire and a method for producing the pneumatic tire.

BACKGROUND ART

Self-sealing tires with sealants applied to the inner peripheries thereof have been known as puncture resistant pneumatic tires (hereinafter, pneumatic tires are also referred to simply as tires). Sealants automatically seal puncture holes formed in such self-sealing tires.

Several methods have been known for producing self-sealing tires, including, for example, a method that includes: adding an organic solvent to a sealant to reduce the viscosity of the sealant so as to be easy to handle; attaching the diluted sealant to the inner surface of a tire; and removing the organic solvent from the attached diluted sealant, and a method that includes: mixing a base agent prepared in a batch kneader with a curing agent using a static mixer or dynamic mixer to prepare a sealant; and attaching the sealant to the inner periphery of a tire.

Tires generate various types of noise. For example, there is a problem in that tire cavity resonance occurs during running on roads. Patent Literature 1 discloses a technique to reduce cavity resonance by attaching a sponge to the inner side of a tire innerliner with a specific sealant.

Air column resonance in longitudinal groove patterns is also a cause of vehicle pass-by noise. Improvement is also needed with regard to the pass-by noise because national governments have, year after year, imposed stricter regulations on the noise to preserve the living environment and protect the health of the residents.

CITATION LIST

Patent Literature

Patent Literature 1: JP 2013-43643 A

SUMMARY OF INVENTION

Technical Problem

With regard to tire cavity resonance, however, the technique of Patent Literature 1 which attaches a sponge with a specific sealant may cause the following phenomenon. In the process of air-sealing after a nail is used to puncture such a self-sealing tire and then removed, the sealant may drag the sponge into the nail hole to clog the hole. Therefore, a little under 10% to 30% of puncture holes cannot be air-sealed.

With regard to air column resonance, pass-by noise can be reduced, for example, by reducing the longitudinal groove pattern volume. However, this results in drainage of less water on the rainy road, thereby making it difficult to ensure safety. Other proposed methods for reducing air column resonance include the use of tire patterns to form resonators, or the use of built-in resonators in tires. However, the former method is not considered popular due to the limited application only to some types of commercial tires. The latter method is impractical because, in the production involving vulcanization in a mold, if a cavity is formed in a tire, the tire cannot be removed from the mold.

The present invention aims to solve the above problems and provide a tire that has excellent tire noise-reducing properties while ensuring practical utility. The present invention also aims to provide a self-sealing tire having excellent sealing performance and excellent tire noise-reducing properties.

Solution To Problem

The present invention relates to a pneumatic tire, including at least one resonator on an inner periphery of the tire, the resonator including a tube with an opening, and a cavity connected to the tube.

Preferably, the inner periphery of the tire corresponds to a tread portion.

Preferably, the resonator is a Helmholtz-type resonator.

Preferably, the opening is provided to face an inside of the tire and/or to penetrate outside of the tire.

Preferably, the opening is provided to penetrate a circumferential longitudinal groove of the tire.

Preferably, the pneumatic tire includes the multiple resonators tuned to different frequencies.

Preferably, the resonators are circumferentially provided at substantially equally spaced intervals.

Preferably, the resonators tuned to the same frequency are provided circumferentially symmetrically about an axis of the tire.

Preferably, the cavity of the resonator has no bottom surface, but a surface of a sealant layer is provided as a substitute for the bottom surface, and the opening is provided to face an inside of the tire.

Preferably, the pneumatic tire includes a sealant layer located radially inside an innerliner, and the resonator located radially inside the sealant layer; the sealant layer is formed by continuously and spirally applying a generally string-shaped sealant to the inner periphery of the tire; and the resonator is attached with the sealant applied to the inner periphery of the tire.

Preferably, the sealant contains a rubber component including a butyl-based rubber, a liquid polymer, and an organic peroxide, the sealant contains 1 to 30 parts by mass of an inorganic filler relative to 100 parts by mass of the rubber component, and the sealant layer has a thickness of 1.0 to 10.0 mm and a width of 85% to 115% of a width of a breaker of the tire.

Preferably, the sealant layer is formed by sequentially preparing a sealant by mixing raw materials including a crosslinking agent using a continuous kneader, and sequentially applying the sealant to the inner periphery of the tire.

Preferably, the sealant discharged from an outlet of the continuous kneader has a temperature of 70° C. to 150° C.

The present invention also relates to a method for producing a pneumatic tire, the method including the step of attaching the resonator.

Preferably, the method includes the steps of: continuously and spirally applying a generally string-shaped sealant to an inner periphery of a vulcanized tire; and attaching the resonator after the application of the sealant.

Advantageous Effects of Invention

The pneumatic tire of the present invention includes a resonator on the inner periphery of the tire, and the resonator includes a tube with an opening, and a cavity connected to the tube. Such a pneumatic tire has excellent noise-reducing properties while ensuring practical utility.

A first pneumatic tire of the present invention including a resonator whose opening is provided to face the inside of the tire can reduce tire cavity resonance (road noise). Particularly in the case of a first pneumatic tire (self-sealing tire) of the present invention which includes a sealant layer located radially inside an innerliner, and the resonator located radially inside the sealant layer, and in which the sealant layer is formed by continuously and spirally applying a generally string-shaped sealant to the inner periphery of the tire, and the resonator is attached with the sealant applied to the inner periphery of the tire, the following advantages can be obtained: cavity resonance can be reduced, the resonator can be attached by taking advantage of the adhesiveness of the sealant, and in spite of utilizing the adhesiveness, the deterioration of sealing performance can be prevented so that the tire can maintain the sealing performance. Furthermore, practical utility can also be ensured.

A second pneumatic tire of the present invention including a resonator whose opening is provided to penetrate outside of the tire can reduce air column resonance (pattern noise) in the tire grooves. Like the first self-sealing tire, particularly the second pneumatic tire (self-sealing tire) of the present invention which includes a resonator whose opening is provided to penetrate outside of the tire provides the following advantages: air column resonance can be reduced, the resonator can be closely attached by taking advantage of the adhesiveness of the sealant, and leakage of the air in the tire through the opening can be prevented due to the close attachment achieved by virtue of the adhesiveness, whereby the retention of the air in the tire can be maintained. It is also possible to retain the air even upon puncture because the sealant exhibits sealing performance. Practical utility can also be ensured.

The method for producing a pneumatic tire of the present invention includes the step of attaching the resonator. By this method, tires with high tire noise-reducing properties can be stably produced with high productivity. Particularly the method for producing a self-sealing tire includes the steps of continuously and spirally applying a generally string-shaped sealant to the inner periphery of a vulcanized tire; and attaching the resonator after the application of the sealant.

Such a method can stably produce, with high productivity, the first self-sealing tire of the present invention which achieves good cavity resonance-reducing properties, adhesion of the resonator, sealing performance (air retention properties) upon puncture, and practical utility.

Furthermore, such a method can stably produce, with high productivity, the second self-sealing tire which achieves good air column resonance-reducing properties, adhesion of the resonator, prevention of leakage of the air in the tire through the opening, sealing performance (air retention properties) upon puncture, and practical utility.

DESCRIPTION OF EMBODIMENTS

Figure 1:
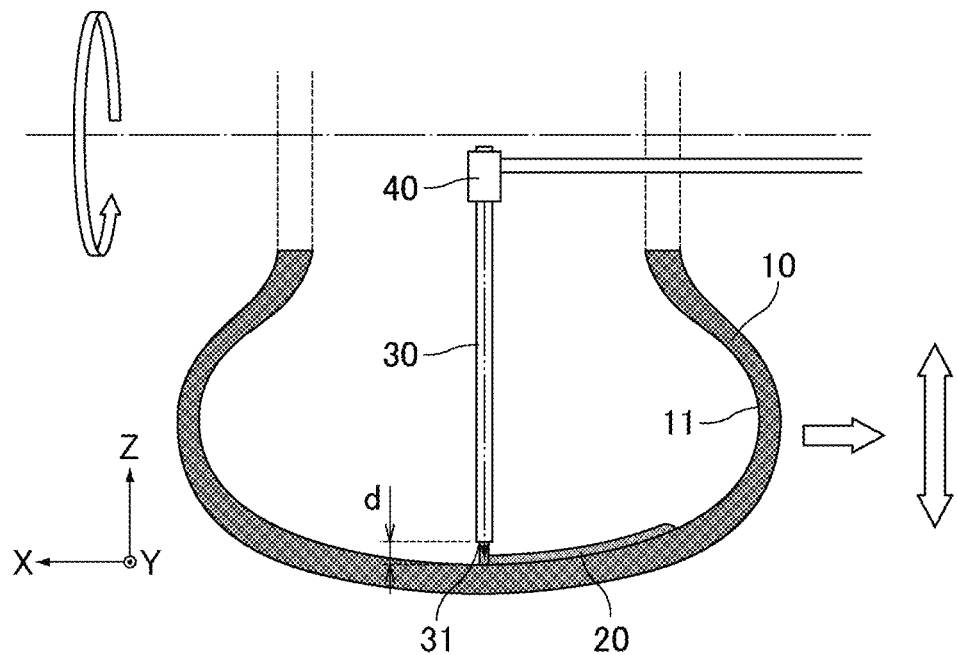
FIG. 1 is an explanatory view schematically showing an example of an applicator used in a method for producing a self-sealing tire.

The pneumatic tire of the present invention includes a resonator on the inner periphery of the tire, and the resonator includes a tube with an opening, and a cavity connected to the tube. Such a pneumatic tire of the present invention can be produced by, for example, a method including the step of attaching the resonator.

(First Pneumatic Tire)

The first embodiment of the pneumatic tire of the present invention may be a first pneumatic tire which includes a resonator whose opening is provided to face the inside of the tire. The first pneumatic tire including a resonator whose opening is provided to face the inside of the tire can reduce tire cavity resonance while preventing the above-described phenomenon observed when a sponge is attached. Particularly in the case of a first self-sealing tire in which a resonator is attached with a sealant, cavity resonance can be reduced, the resonator can be better attached by taking advantage of the adhesiveness of the sealant, and in spite of utilizing the adhesiveness, the deterioration of sealing performance can be prevented so that the tire can maintain the sealing performance (air retention properties) upon puncture. Furthermore, good practical utility can also be obtained.

The first pneumatic tire of the present invention including a resonator whose opening is provided to face the inside of the tire can be produced by attaching (placing) a resonator to the inner periphery of a tire with an adhesive, a sealant, or the like while allowing the opening to face the inside of the tire. For example, a first pneumatic tire which includes a resonator whose opening is provided to face the inside of the tire and does not include a sealant layer can be produced by attaching the resonator to the inner periphery of an innerliner with an adhesive or the like, without forming a sealant layer as described later. A first self-sealing tire of the present invention in which a resonator whose opening is provided to face the inside of the tire is attached with a sealant applied to the inner periphery of the tire can be produced by forming a sealant layer and then attaching the resonator to the sealant layer by taking advantage of the adhesiveness of the layer.

(Second pneumatic tire)

The second embodiment of the pneumatic tire of the present invention may be a second pneumatic tire which includes a resonator whose opening is provided to penetrate outside of the tire. The second pneumatic tire including a resonator whose opening is provided to penetrate outside of the tire can reduce air column resonance in the tire grooves. Particularly in the case of a second self-sealing tire in which a resonator is attached with a sealant, air column resonance can be reduced, and the resonator can be better attached by taking advantage of the adhesiveness of the sealant. Although the penetration outside of the tire may cause air leakage, such leakage of the air in the tire through the opening can also be prevented by closely attaching the resonator by taking advantage of the adhesiveness of the sealant, whereby the retention of the air in the tire can be maintained. Furthermore, it is possible to retain the air even upon puncture with a nail or the like because the sealant exhibits sealing performance. In addition, practical utility can also be ensured.

The second pneumatic tire of the present invention including a resonator whose opening is provided to penetrate outside of the tire can be produced as a self-sealing tire by attaching (placing) a resonator to the inner periphery of a tire with a sealant while allowing the opening to penetrate outside of the tire.

The following describes methods for producing the first or second self-sealing tire as examples of the method for producing a pneumatic tire of the present invention. The exemplary methods include the steps of: continuously and spirally applying a generally string-shaped sealant to the inner periphery of a vulcanized tire; and attaching the resonator after the application of the sealant.

The first or second self-sealing tire may be produced, for example, by preparing a sealant by mixing the components of the sealant, and then attaching the sealant to the inner periphery of a tire by application or other means to form a sealant layer. The self-sealing tire includes the sealant layer located radially inside an innerliner.

The hardness (viscosity) of the sealant needs to be adjusted to an appropriate viscosity according to the service temperature by controlling the rubber component and the degree of crosslinking. The rubber component is controlled by varying the type and amount of liquid rubber, plasticizers, or carbon black, while the degree of crosslinking is controlled by varying the type and amount of crosslinking agents or crosslinking activators.

Any sealant that shows adhesion may be used, and rubber compositions conventionally used to seal punctures of tires can be used. The rubber component constituting a main ingredient of such a rubber composition may include a butyl-based rubber. Examples of the butyl-based rubber include butyl rubber (IIR) and halogenated butyl rubbers (X-IIR) such as brominated butyl rubber (Br-IIR) and chlorinated butyl rubber (Cl-IIR). In particular, in view of fluidity and other properties, either or both of butyl rubber and halogenated butyl rubbers can be suitably used. The butyl-based rubber to be used is preferably in the form of pellets. Such a pelletized butyl-based rubber can be precisely and suitably supplied to a continuous kneader so that the sealant can be produced with high productivity.

To reduce the deterioration of the fluidity of the sealant, the butyl-based rubber to be used is preferably a butyl-based rubber A having a Mooney viscosity $ML_{1+8}$ at 125° C. of at least 20 but less than 40 and/or a butyl-based rubber B having a Mooney viscosity $ML_{1+8}$ at 125° C. of at least 40 but not more than 80. It is particularly suitable to use at least the butyl-based rubber A. When the butyl-based rubbers A and B are used in combination, the blending ratio may be appropriately chosen.

The Mooney viscosity $ML_{1+8}$ at 125° C. of the butyl-based rubber A is more preferably 25 or more, still more preferably 28 or more, but more preferably 38 or less, still more preferably 35 or less. If the Mooney viscosity is less than 20, the fluidity may be reduced. If the Mooney viscosity is 40 or more, the effect of the combined use may not be achieved.

The Mooney viscosity $ML_{1+8}$ at 125° C. of the butyl-based rubber B is more preferably 45 or more, still more preferably 48 or more, but more preferably 70 or less, still more preferably 60 or less. If the Mooney viscosity is less than 40, the effect of the combined use may not be achieved. If the Mooney viscosity is more than 80, sealing performance may be reduced.

The Mooney viscosity $ML_{1+8}$ at 125° C. is determined in conformity with JIS K-6300-1:2001 at a test temperature of 125° C. using an L type rotor with a preheating time of one minute and a rotation time of eight minutes.

The rubber component may be a combination with other ingredients such as diene rubbers, including natural rubber (NR), polyisoprene rubber (IR), polybutadiene rubber (BR), styrene-butadiene rubber (SBR), styrene-isoprene-butadiene rubber (SIBR), ethylene-propylene-diene rubber (EPDM), chloroprene rubber (CR), acrylonitrile-butadiene rubber (NBR), and butyl rubber (IIR). In view of fluidity and other properties, the amount of the butyl-based rubber based on 100% by mass of the rubber component is preferably 90% by mass or more, more preferably 95% by mass or more, particularly preferably 100% by mass.

Examples of the liquid polymer used in the sealant include liquid polybutene, liquid polyisobutene, liquid polyisoprene, liquid polybutadiene, liquid poly-α-olefin, liquid isobutylene, liquid ethylene-α-olefin copolymers, liquid ethylene-propylene copolymers, and liquid ethylene-butylene copolymers. To provide adhesion and other properties, liquid polybutene is preferred among these. Examples of the liquid polybutene include copolymers having a long-chain hydrocarbon molecular structure which is based on isobutene and further reacted with normal butene. Hydrogenated liquid polybutene may also be used.

To prevent the sealant from flowing during high-speed running, the liquid polymer (e.g. liquid polybutene) to be used is preferably a liquid polymer A having a kinematic viscosity at 100° C. of 550 to 625 $mm^2/s$ and/or a liquid polymer B having a kinematic viscosity at 100° C. of 3,540 to 4,010 $mm^2/s$, more preferably a combination of the liquid polymers A and B.

The kinematic viscosity at 100° C. of the liquid polymer A (e.g. liquid polybutene) is preferably 550 $mm^2/s$ or higher, more preferably 570 $mm^2/s$ or higher. If the kinematic viscosity is lower than 550 $mm^2/s$, flowing of the sealant may occur. The kinematic viscosity at 100° C. is preferably 625 $mm^2/s$ or lower, more preferably 610 $mm^2/s$ or lower. If the kinematic viscosity is higher than 625 $mm^2/s$, the sealant may have higher viscosity and deteriorated extrudability.

The kinematic viscosity at 100° C. of the liquid polymer B (e.g. liquid polybutene) is preferably 3,600 $mm^2/s$ or higher, more preferably 3,650 $mm^2/s$ or higher. If the kinematic viscosity is lower than 3,540 $mm^2/s$, the sealant may have too low a viscosity and easily flow during service of the tire, resulting in deterioration of sealing performance or uniformity.

The kinematic viscosity at 100° C. is preferably 3, 900 mm$^2$/s or lower, more preferably 3,800 mm$^2$/s or lower. If the kinematic viscosity is higher than 4,010 mm$^2$/s, sealing performance may deteriorate.

The kinematic viscosity at 40° C. of the liquid polymer A (e.g. liquid polybutene) is preferably 20,000 mm$^2$/s or higher, more preferably 23,000 mm$^2$/s or higher. If the kinematic viscosity is lower than 20,000 mm$^2$/s, the sealant may be soft so that its flowing can occur. The kinematic viscosity at 40° C. is preferably 30,000 mm$^2$/s or lower, more preferably 28,000 mm$^2$/s or lower. If the kinematic viscosity is higher than 30,000 mm$^2$/s, the sealant may have too high a viscosity and deteriorated sealing performance.

The kinematic viscosity at 40° C. of the liquid polymer B (e.g. liquid polybutene) is preferably 120,000 mm$^2$/s or higher, more preferably 150,000 mm$^2$/s or higher. If the kinematic viscosity is lower than 120,000 mm$^2$/s, the sealant may have too low a viscosity and easily flow during service of the tire, resulting in deterioration of sealing performance or uniformity.

The kinematic viscosity at 40° C. is preferably 200,000 mm$^2$/s or lower, more preferably 170,000 mm$^2$/s or lower. If the kinematic viscosity is higher than 200,000 mm$^2$/s, the sealant may have too high a viscosity and deteriorated sealing performance.

The kinematic viscosity is determined in conformity with JIS K 2283-2000 at 100° C. or 40° C.

The amount of the liquid polymer (the combined amount of the liquid polymers A and B and other liquid polymers) relative to 100 parts by mass of the rubber component is preferably 50 parts by mass or more, more preferably 100 parts by mass or more, still more preferably 150 parts by mass or more. If the amount is less than 50 parts by mass, adhesion may be reduced. The amount is preferably 400 parts by mass or less, more preferably 300 parts by mass or less, still more preferably 250 parts by mass or less. If the amount is more than 400 parts by mass, flowing of the sealant may occur.

In the case where the liquid polymers A and B are used in combination, the blending ratio of these polymers [(amount of liquid polymer A)/(amount of liquid polymer B)] is preferably 10/90 to 90/10, more preferably 30/70 to 70/30, still more preferably 40/60 to 60/40. When the blending ratio is within the range indicated above, the sealant is provided with good adhesion.

The organic peroxide (crosslinking agent) is not particularly limited, and conventionally known compounds can be used. The use of a butyl-based rubber and a liquid polymer in an organic peroxide crosslinking system improves adhesion, sealing performance, fluidity, and processability.

Examples of the organic peroxide include acyl peroxides such as benzoyl peroxide, dibenzoyl peroxide, and p-chlorobenzoyl peroxide; peroxyesters such as 1-butyl peroxyacetate, t-butyl peroxybenzoate, and t-butyl peroxyphthalate; ketone peroxides such as methyl ethyl ketone peroxide; alkyl peroxides such as di-t-butylperoxybenzoate and 1,3-bis(1-butylperoxyisopropyl)benzene; hydroperoxides such as t-butyl hydroperoxide; and dicumyl peroxide and t-butylcumyl peroxide. In view of adhesion and fluidity, acyl peroxides are preferred among these, with dibenzoyl peroxide being particularly preferred. Moreover, the organic peroxide (crosslinking agent) to be used is preferably in the form of powder or a dilution (slurry or suspension) thereof. The organic peroxide (crosslinking agent) in such a form can be precisely and suitably supplied to a continuous kneader so that the sealant can be produced with high productivity.

The amount of the organic peroxide (crosslinking agent) relative to 100 parts by mass of the rubber component is preferably 0.5 parts by mass or more, more preferably 1 part by mass or more, still more preferably 5 parts by mass or more. If the amount is less than 0.5 parts by mass, crosslink density may decrease so that flowing of the sealant can occur. The amount is preferably 40 parts by mass or less, more preferably 20 parts by mass or less, still more preferably 15 parts by mass or less. If the amount is more than 40 parts by mass, crosslink density may increase so that the sealant can be hardened and show reduced sealing performance.

The crosslinking activator (vulcanization accelerator) to be used may be at least one selected from the group consisting of sulfenamide crosslinking activators, thiazole crosslinking activators, thiuram crosslinking activators, thiourea crosslinking activators, guanidine crosslinking activators, dithiocarbamate crosslinking activators, aldehyde-amine crosslinking activators, aldehyde-ammonia crosslinking activators, imidazoline crosslinking activators, xanthate crosslinking activators, and quinone dioxime compounds (quinoid compounds). For example, quinone dioxime compounds (quinoid compounds) can be suitably used. The use of a butyl-based rubber and a liquid polymer in a crosslinking system including a crosslinking activator added to an organic peroxide improves adhesion, sealing performance, fluidity, and processability.

Examples of the quinone dioxime compound include p-benzoquinone dioxime, p-quinone dioxime, p-quinone dioxime diacetate, p-quinone dioxime dicaproate, p-quinone dioxime dilaurate, p-quinone dioxime distearate, p-quinone dioxime dicrotonate, p-quinone dioxime dinaphthenate, p-quinone dioxime succinate, p-quinone dioxime adipate, p-quinone dioxime difuroate, p-quinone dioxime dibenzoate, p-quinone dioxime di(o-chlorobenzoate), p-quinone dioxime di(p-chlorobenzoate), p-quinone dioxime di(p-nitrobenzoate), p-quinone dioxime di(m-nitrobenzoate), p-quinone dioxime di(3,5-dinitrobenzoate), p-quinone dioxime di(p-methoxybenzoate), p-quinone dioxime di(n-amyloxybenzoate), and p-quinone dioxime di(m-bromobenzoate). In view of adhesion, sealing performance, and fluidity, p-benzoquinone dioxime is preferred among these. Moreover, the crosslinking activator (vulcanization accelerator) to be used is preferably in the form of powder. Such a powdered crosslinking activator (vulcanization accelerator) can be precisely and suitably supplied to a continuous kneader so that the sealant can be produced with high productivity.

The amount of the crosslinking activator (e.g. quinone dioxime compounds) relative to 100 parts by mass of the rubber component is preferably 0.5 parts by mass or more, more preferably 1 part by mass or more, still more preferably 3 parts by mass or more. If the amount is less than 0.5 parts by mass, flowing of the sealant may occur. The amount is preferably 40 parts by mass or less, more preferably 20 parts by mass or less, still more preferably 15 parts by mass or less. If the amount is more than 40 parts by mass, sealing performance may be reduced.

The sealant may further contain an inorganic filler such as carbon black, silica, calcium carbonate, calcium silicate, magnesium oxide, aluminum oxide, barium sulfate, talc, or mica; or a plasticizer such as aromatic process oils, naphthenic process oils, or paraffinic process oils.

The amount of the inorganic filler relative to 100 parts by mass of the rubber component is preferably 1 part by mass or more, more preferably 10 parts by mass or more. If the amount is less than 1 part by mass, sealing performance may be reduced due to degradation by ultraviolet rays. The amount is preferably 50 parts by mass or less, more preferably 40 parts by mass or less, still more preferably 30 parts by mass or less. If the amount is more than 50 parts by mass, the sealant may have too high a viscosity and deteriorated sealing performance.

To prevent degradation by ultraviolet rays, the inorganic filler is preferably carbon black. In this case, the amount of the carbon black relative to 100 parts by mass of the rubber component is preferably 1 part by mass or more, more preferably 10 parts by mass or more. If the amount is less than 1 part by mass, sealing performance may be reduced due to degradation by ultraviolet rays. The amount is preferably 50 parts by mass or less, more preferably 40 parts by mass or less, still more preferably 25 parts by mass or less. If the amount is more than 50 parts by mass, the sealant may have too high a viscosity and deteriorated sealing performance.

The amount of the plasticizer relative to 100 parts by mass of the rubber component is preferably 1 part by mass or more, more preferably 5 parts by mass or more. If the amount is less than 1 part by mass, the sealant may show lower adhesion to tires, failing to have sufficient sealing performance. The amount is preferably 40 parts by mass or less, more preferably 20 parts by mass or less. If the amount is more than 40 parts by mass, the sealant may slide in the kneader so that it cannot be easily kneaded.

The sealant is preferably prepared by mixing a pelletized butyl-based rubber, a powdered crosslinking agent, and a powdered crosslinking activator, and more preferably by mixing a pelletized butyl-based rubber, a liquid polybutene, a plasticizer, carbon black powder, a powdered crosslinking agent, and a powdered crosslinking activator. Such raw materials can be suitably supplied to a continuous kneader so that the sealant can be produced with high productivity.

The sealant is preferably obtained by incorporating a rubber component including butyl rubber with predetermined amounts of a liquid polymer, an organic peroxide, and a crosslinking activator.

A sealant obtained by incorporating butyl rubber with a liquid polymer such as liquid polybutene, especially wherein the butyl rubber and the liquid polymer are each a combination of two or more materials having different viscosities, can achieve a balanced improvement in adhesion, sealing performance, fluidity, and processability. This is because the introduction of a liquid polymer component to an organic peroxide crosslinking system using butyl rubber as the rubber component provides adhesion, and especially the use of liquid polymers or solid butyl rubbers having different viscosities reduces flowing of the sealant during high-speed running. Therefore, the sealant can achieve a balanced improvement in adhesion, sealing performance, fluidity, and processability.

The viscosity at 40° C. of the sealant is not particularly limited. In order to allow the sealant to suitably maintain a generally string shape when it is applied to the inner periphery of a tire, and in view of adhesion, fluidity, and other properties, the viscosity at 40° C. is preferably 3,000 Pa·s or higher, more preferably 5,000 Pa·s or higher, but preferably 70,000 Pa·s or lower, more preferably 50,000 Pa·s or lower. If the viscosity is lower than 3,000 Pa·s, the applied sealant may flow when the tire stops rotating, so that the sealant cannot maintain the film thickness. Also, if the viscosity is higher than 70,000 Pa·s, the sealant cannot be easily discharged from the nozzle.

The viscosity of the sealant is determined at 40° C. in conformity with JIS K 6833 using a rotational viscometer.

A self-sealing tire including a sealant layer located radially inside an innerliner can be produced by preparing a sealant by mixing the aforementioned materials, and applying the sealant to the inner periphery of a tire, and preferably to a radially inner side of an innerliner. The materials of the sealant may be mixed using known continuous kneaders, for example. In particular, they are preferably mixed using a co-rotating or counter-rotating multi-screw kneading extruder, and especially a twin screw kneading extruder.

The continuous kneader (especially twin screw kneading extruder) preferably has a plurality of supply ports for supplying raw materials, more preferably at least three supply ports, still more preferably at least three supply ports including upstream, midstream, and downstream supply ports. By sequentially supplying the raw materials to the continuous kneader (especially twin screw kneading extruder), the raw materials are mixed and sequentially and continuously prepared into a sealant.

Preferably, the raw materials are sequentially supplied to the continuous kneader (especially twin screw kneading extruder), starting from the material having a higher viscosity. In this case, the materials can be sufficiently mixed and prepared into a sealant of a consistent quality. Moreover, powder materials, which improve kneadability, should be introduced as upstream as possible.

The organic peroxide is preferably supplied to the continuous kneader (especially twin screw kneading extruder) through its downstream supply port. In this case, the time period from supplying the organic peroxide to applying the sealant to a tire can be shortened so that the sealant can be applied to a tire before it is cured. This allows for more stable production of self-sealing tires.

Since kneading is unsuccessfully accomplished when a large amount of the liquid polymer is introduced at once into the continuous kneader (especially twin screw kneading extruder), the liquid polymer is preferably supplied to the continuous kneader (especially twin screw kneading extruder) through a plurality of supply ports. In this case, the sealant can be more suitably kneaded.

When a continuous kneader (especially twin screw kneading extruder) is used, the sealant is preferably prepared using the continuous kneader (especially twin screw kneading extruder) having at least three supply ports by supplying a rubber component such as a butyl-based rubber, an inorganic filler, and a crosslinking activator each from the upstream supply port, a liquid polymer B from the midstream supply port, and a liquid polymer A, an organic peroxide, and a plasticizer each from the downstream supply port of the continuous kneader (especially twin screw kneading extruder), followed by kneading and extrusion. The materials such as liquid polymers may be entirely or partially supplied from the respective supply ports. Preferably, 95% by mass or more of the total amount of each material is supplied from the supply port.

Preferably, all the raw materials to be introduced into the continuous kneader are introduced into the continuous kneader under the control of a quantitative feeder. This allows for continuous and automated preparation of the sealant.

Any feeder that can provide quantitative feeding may be used, including known feeders such as screw feeders, plunger pumps, gear pumps, mohno pumps, tube pumps, or diaphragm pumps.

Solid raw materials (especially pellets or powder) such as pelletized butyl-based rubbers, carbon black powder, powdered crosslinking agents, and powdered crosslinking activators are preferably quantitatively supplied using a screw feeder. This allows the solid raw materials to be supplied precisely in fixed amounts, thereby allowing for the production of a higher quality sealant and therefore a higher quality self-sealing tire.

Moreover, the solid raw materials are preferably individually supplied through separate respective feeders. In this case, the raw materials need not to be blended beforehand, which facilitates supply of the materials in the mass production.

The plasticizer is preferably quantitatively supplied using a plunger pump. This allows the plasticizer to be supplied precisely in a fixed amount, thereby allowing for the production of a higher quality sealant and therefore a higher quality self-sealing tire.

The liquid polymer is preferably quantitatively supplied using a gear pump. This allows the liquid polymer to be supplied precisely in a fixed amount, thereby allowing for the production of a higher quality sealant and therefore a higher quality self-sealing tire.

The liquid polymer to be supplied is preferably kept under constant temperature control. The constant temperature control allows the liquid polymer to be supplied more precisely in a fixed amount. The liquid polymer to be supplied preferably has a temperature of 20° C. to 90° C., more preferably 40° C. to 70° C.

In view of easy mixing and extrudability, the mixing in the continuous kneader (especially twin screw kneading extruder) is preferably carried out at a barrel temperature of 30° C. (preferably 50° C.) to 150° C.

In view of sufficient mixing, preferably, the materials supplied upstream are mixed for 1 to 3 minutes, and the materials supplied midstream are mixed for 1 to 3 minutes, while the materials supplied downstream are preferably mixed for 0.5 to 2 minutes in order to avoid crosslinking. The times for mixing the materials each refer to the residence time in the continuous kneader (especially twin screw kneading extruder) from supply to discharge. For example, the time for mixing the materials supplied downstream means the residence time from when they are supplied through a downstream supply port until they are discharged.

By varying the screw rotational speed of the continuous kneader (especially twin screw kneading extruder) or the setting of a temperature controller, it is possible to control the temperature of the sealant discharged from the outlet and therefore the rate of curing acceleration of the sealant. As the screw rotational speed of the continuous kneader (especially twin screw kneading extruder) increases, kneadability and material temperature increase. The screw rotational speed does not affect the discharge amount. In view of sufficient mixing and control of the rate of curing acceleration, the screw rotational speed is preferably 50 to 700 (preferably 550) rpm.

In view of sufficient mixing and control of the rate of curing acceleration, the temperature of the sealant discharged from the outlet of the continuous kneader (especially twin screw kneading extruder) is preferably 70° C. to 150° C., more preferably 90° C. to 130° C. When the temperature of the sealant is within the range indicated above, the crosslinking reaction begins upon the application of the sealant and the sealant adheres well to the inner periphery of a tire and, at the same time, the crosslinking reaction more suitably proceeds, whereby a self-sealing tire having high sealing performance can be produced. Moreover, the crosslinking step described later is not required in this case.

The amount of the sealant discharged from the outlet of the continuous kneader (especially twin screw kneading extruder) is determined according to the amounts of the raw materials supplied to the supply ports. The amounts of the raw materials supplied to the supply ports are not particularly limited, and a person skilled in the art can appropriately select the amounts. To suitably produce a self-sealing tire having much better uniformity and sealing performance, preferably a substantially constant amount (discharge amount) of the sealant is discharged from the outlet.

Herein, the substantially constant discharge amount means that the discharge amount varies within a range of 93% to 107%, preferably 97% to 103%, more preferably 98% to 102%, still more preferably 99% to 101%.

The outlet of the continuous kneader (especially twin screw kneading extruder) is preferably connected to a nozzle. Since the continuous kneader (especially twin screw kneading extruder) can discharge the materials at a high pressure, the prepared sealant can be attached in a thin, generally string shape (bead shape) to a tire by means of a nozzle (preferably a small diameter nozzle creating high resistance) mounted on the outlet. Specifically, by discharging the sealant from a nozzle connected to the outlet of the continuous kneader (especially twin screw kneading extruder) to sequentially apply it to the inner periphery of a tire, the applied sealant has a substantially constant thickness, thereby preventing deterioration of tire uniformity. This allows for the production of a self-sealing tire that is excellent in weight balance.

Next, for example, the mixed sealant is discharged from the nozzle connected to the outlet of the extruder such as a continuous kneader (especially twin screw kneading extruder) to feed and apply the sealant directly to the inner periphery of a vulcanized tire, whereby a self-sealing tire can be produced. In this case, since the sealant which has been mixed in, for example, a twin screw kneading extruder and in which the crosslinking reaction in the extruder is suppressed is directly applied to the tire inner periphery, the crosslinking reaction of the sealant begins upon the application and the sealant adheres well to the tire inner periphery and, at the same time, the crosslinking reaction suitably proceeds. For this reason, the sealant applied to the tire inner periphery forms a sealant layer while suitably maintaining a generally string shape. Accordingly, the sealant can be applied and processed in a series of steps and therefore productivity is further improved. Moreover, the application of the sealant to the inner periphery of a vulcanized tire further enhances the productivity of self-sealing tires. Furthermore, the sealant discharged from the nozzle connected to the outlet of the continuous kneader (especially twin screw kneading extruder) is preferably sequentially applied directly to the inner periphery of a tire. In this case, since the sealant in which the crosslinking reaction in the continuous kneader (especially twin screw kneading extruder) is suppressed is directly and continuously applied to the tire inner periphery, the crosslinking reaction of the sealant begins upon the application and the sealant adheres well to the tire inner periphery and, at the same time, the crosslinking reaction suitably proceeds, whereby a self-sealing tire that is excellent in weight balance can be produced with higher productivity.

With regard to the application of the sealant to the inner periphery of a tire, the sealant may be applied at least to the inner periphery of a tire that corresponds to a tread portion, and more preferably at least to the inner periphery of a tire that corresponds to a breaker. Omitting the application of the sealant to areas where the sealant is unnecessary further enhances the productivity of self-sealing tires.

Figure 9:
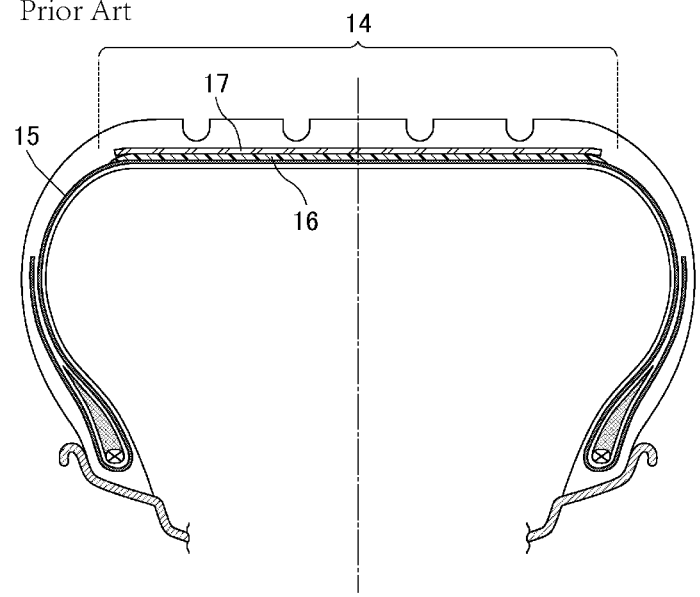
FIG. 9 is an explanatory view schematically showing an example of a cross section of a pneumatic tire.

The inner periphery of a tire that corresponds to a tread portion refers to a portion of the inner periphery of a tire that is located radially inside a tread portion which contacts the road surface. The inner periphery of a tire that corresponds to a breaker refers to a portion of the inner periphery of a tire that is located radially inside a breaker. The breaker refers to a component placed inside a tread and radially outside a carcass. Specifically, it is a component shown as a breaker 16 in FIG. 9, for example.

Unvulcanized tires are usually vulcanized using bladders. During the vulcanization, such a bladder inflates and closely attaches to the inner periphery (innerliner) of the tire. Hence, a mold release agent is usually applied to the inner periphery (innerliner) of the tire to avoid adhesion between the bladder and the inner periphery (innerliner) of the tire after completion of the vulcanization.

The mold release agent is usually a water-soluble paint or a mold-releasing rubber. However, the presence of the mold release agent on the inner periphery of the tire may impair the adhesion between the sealant and the inner periphery of the tire. For this reason, it is preferred to preliminarily remove the mold release agent from the inner periphery of the tire. In particular, the mold release agent is more preferably preliminarily removed at least from a portion of the tire inner periphery in which application of the sealant starts. Still more preferably, the mold release agent is preliminarily removed from the entire area of the tire inner periphery where the sealant is to be applied. In this case, the sealant adheres better to the tire inner periphery and therefore a self-sealing tire having higher sealing performance can be produced.

The mold release agent may be removed from the tire inner periphery by any method, including known methods such as buffing treatment, laser treatment, high pressure water washing, and removal with detergents and preferably with neutral detergents.

Figure 7:
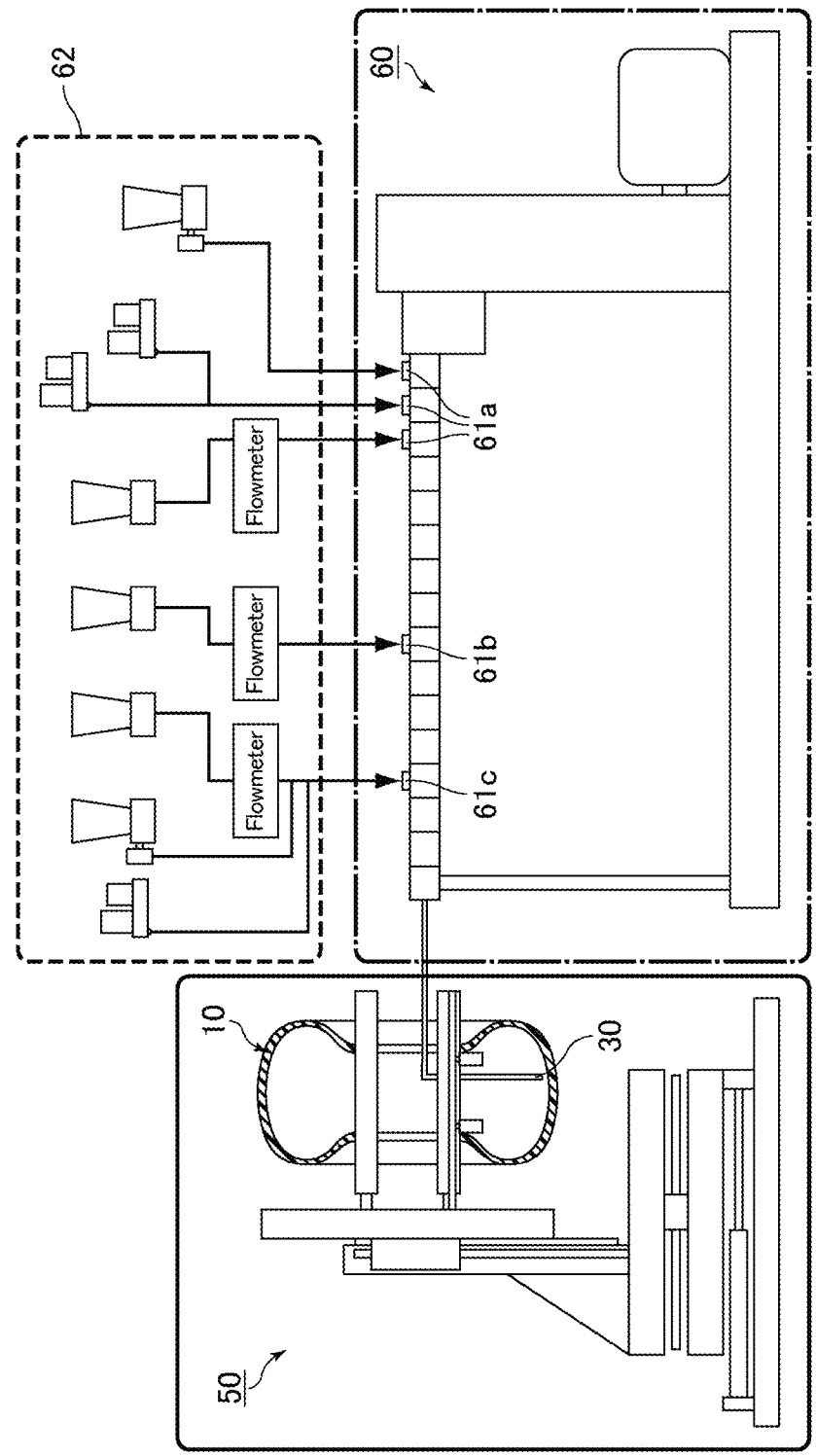
FIG. 7 is an explanatory view schematically showing an example of a production facility used in a method for producing a self-sealing tire.

An example of a production facility used in the method for producing a self-sealing tire will be briefly described below referring to FIG. 7.

The production facility includes a twin screw kneading extruder 60, a material feeder 62 for supplying raw materials to the twin screw kneading extruder 60, and a rotary drive device 50 which fixes and rotates a tire 10 while moving the tire in the width and radial directions of the tire. The twin screw kneading extruder 60 has five supply ports 61, specifically, including three upstream supply ports 61a, one midstream supply port 61b, and one downstream supply port 61c. Further, the outlet of the twin screw kneading extruder 60 is connected to a nozzle 30.

The raw materials are sequentially supplied from the material feeder 62 to the twin screw kneading extruder 60 through the supply ports 61 of the twin screw kneading extruder 60 and then kneaded in the twin screw kneading extruder 60 to sequentially prepare a sealant. The prepared sealant is continuously discharged from the nozzle 30 connected to the outlet of the twin screw kneading extruder 60. The tire is traversed and/or moved up and down (moved in the width direction and/or the radial direction of the tire) while being rotated by the tire drive device, and the sealant discharged from the nozzle 30 is sequentially applied directly to the inner periphery of the tire, whereby the sealant can be continuously and spirally attached to the tire inner periphery. In other words, the sealant can be continuously and spirally attached to the inner periphery of a tire by sequentially applying the sealant continuously discharged from the continuous kneader (especially twin screw kneading extruder) directly to the inner periphery of the tire while rotating the tire and simultaneously moving it in the width direction and/or the radial direction of the tire.

Such a continuous and spiral attachment of the sealant to the tire inner periphery can prevent deterioration of tire uniformity, thereby allowing for the production of a self-sealing tire that is excellent in weight balance. Moreover, the continuous and spiral attachment of the sealant to the tire inner periphery allows for the formation of a sealant layer in which the sealant is uniformly provided in the circumferential and width directions of the tire, and especially in the circumferential direction of the tire. This allows for stable production of self-sealing tires having excellent sealing performance with high productivity. The sealant is preferably attached without overlapping in the width direction and more preferably without gaps. In this case, the deterioration of tire uniformity can be further prevented and a more uniform sealant layer can be formed.

The raw materials are sequentially supplied to a continuous kneader (especially twin screw kneading extruder) which sequentially prepares a sealant. The prepared sealant is continuously discharged from a nozzle connected to the outlet of the continuous kneader (especially twin screw kneading extruder), and the discharged sealant is sequentially applied directly to the inner periphery of a tire. In this manner, self-sealing tires can be produced with high productivity.

The sealant layer is preferably formed by continuously and spirally applying a generally string-shaped sealant to the inner periphery of a tire. In this case, a sealant layer formed of a generally string-shaped sealant provided continuously and spirally along the inner periphery of a tire can be formed on the inner periphery of the tire. The sealant layer may be formed of layers of the sealant, but preferably consists of one layer of the sealant.

In the case of a generally string-shaped sealant, a sealant layer consisting of one layer of the sealant can be formed by continuously and spirally applying the sealant to the inner periphery of a tire. In the case of a generally string-shaped sealant, since the applied sealant has a certain thickness, even a sealant layer consisting of one layer of the sealant can prevent deterioration of tire uniformity and allows for the production of a self-sealing tire having an excellent weight balance and good sealing performance. Moreover, since it is sufficient to only apply one layer of the sealant without stacking layers of the sealant, self-sealing tires can be produced with higher productivity.

Figure 4:
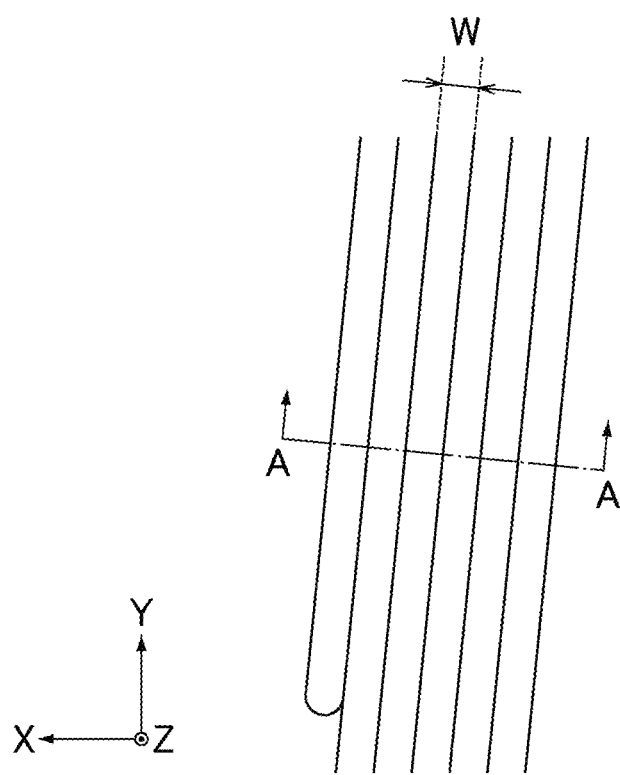
FIG. 4 is an explanatory view schematically showing an example of a generally string-shaped sealant continuously and spirally attached to the inner periphery of the tire.

The number of turns of the sealant around the inner periphery of the tire is preferably 20 to 70, more preferably 20 to 60, still more preferably 35 to 50, because then the deterioration of tire uniformity can be prevented and a self-sealing tire having an excellent weight balance and good sealing performance can be produced with higher productivity. Here, two turns means that the sealant is applied such that it makes two laps around the inner periphery of the tire. In FIG. 4, the number of turns of the sealant is six.

The use of a continuous kneader (especially twin screw kneading extruder) enables the preparation (kneading) of a sealant and the discharge (application) of the sealant to be simultaneously and continuously performed. Thus, a highly viscous and adhesive sealant which is difficult to handle can be directly applied to the inner periphery of a tire without handling it, so that a self-sealing tire can be produced with high productivity. If a sealant is prepared by kneading with a curing agent in a batch kneader, the time period from preparing a sealant to attaching the sealant to a tire is not constant. In contrast, by sequentially preparing a sealant by mixing raw materials including an organic peroxide using a continuous kneader (especially twin screw kneading extruder), and sequentially applying the sealant to the inner periphery of a tire, the time period from preparing a sealant to attaching the sealant to a tire is held constant. Accordingly, when the sealant is applied through a nozzle, the amount of the sealant discharged from the nozzle is stable; furthermore, the sealant shows consistent adhesion while reducing the deterioration of adhesion to the tire, and even a highly viscous and adhesive sealant which is difficult to handle can be precisely applied to the tire inner periphery. Therefore, self-sealing tires of a consistent quality can be stably produced.

The following describes methods for applying the sealant to the inner periphery of a tire.

First Embodiment

According to a first embodiment, a self-sealing tire can be produced, for example, by performing the Steps (1), (2), and (3) below in the process of applying an adhesive sealant through a nozzle to the inner periphery of a tire while rotating the tire and simultaneously moving at least one of the tire and nozzle in the width direction of the tire: Step (1) of measuring the distance between the inner periphery of the tire and the tip of the nozzle using a non-contact displacement sensor; Step (2) of moving at least one of the tire and nozzle in the radial direction of the tire according to the measurement to adjust the distance between the inner periphery of the tire and the tip of the nozzle to a predetermined length; and Step (3) of applying the sealant to the inner periphery of the tire after the distance is adjusted.

The distance between the inner periphery of the tire and the tip of the nozzle can be maintained at a constant length by measuring the distance between the inner periphery of the tire and the tip of the nozzle using a non-contact displacement sensor and feeding back the measurement. Moreover, since the sealant is applied to the tire inner periphery while maintaining the distance at a constant length, the sealant can have a uniform thickness without being affected by variations in tire shape and irregularities at joint portions or the like. Furthermore, since it is not necessary to enter the coordinate data of each tire having a different size as in the conventional art, the sealant can be efficiently applied.

Figure 2:
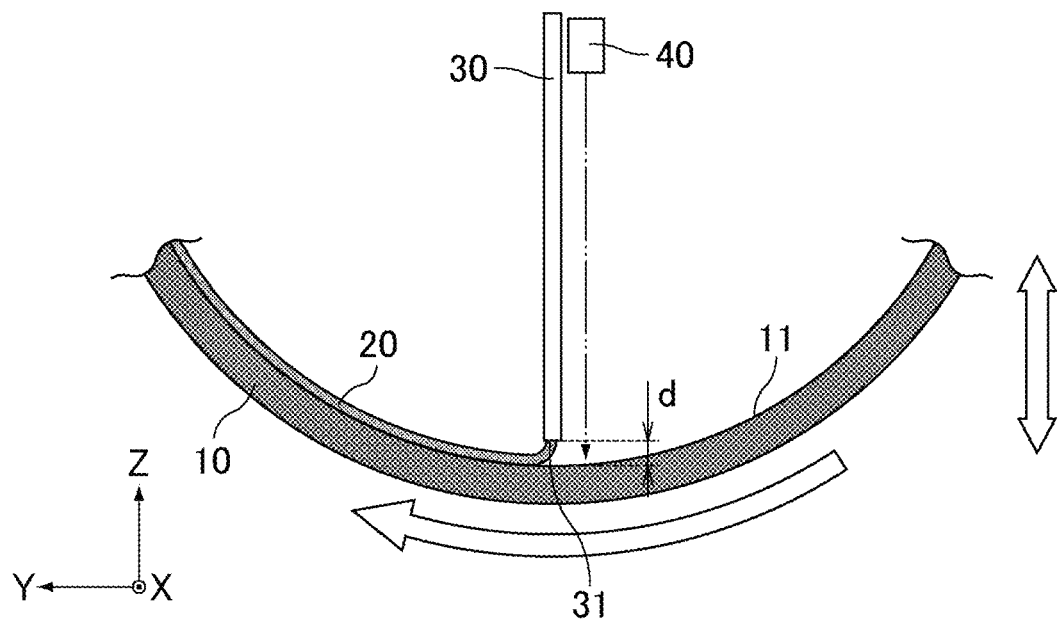
FIG. 2 is an enlarged view showing the vicinity of the tip of the nozzle included in the applicator shown in FIG. 1.

FIG. 1 is an explanatory view schematically showing an example of an applicator used in a method for producing a self-sealing tire, and FIG. 2 is an enlarged view showing the vicinity of the tip of the nozzle included in the applicator shown in FIG. 1.

FIG. 1 shows a cross section of a part of a tire 10 in the meridional direction (a cross section taken along a plane including the width and radial directions of the tire). FIG. 2 shows a cross section of a part of the tire 10 taken along a plane including the circumferential and radial directions of the tire. In FIGS. 1 and 2, the width direction (axis direction) of the tire is indicated by an arrow X, the circumferential direction of the tire is indicated by an arrow Y, and the radial direction of the tire is indicated by an arrow Z.

The tire 10 is mounted on a rotary drive device (not shown) which fixes and rotates a tire while moving the tire in the width and radial directions of the tire. The rotary drive device allows for the following independent operations: rotation around the axis of the tire, movement in the width direction of the tire, and movement in the radial direction of the tire.

The rotary drive device includes a controller (not shown) capable of controlling the amount of movement in the radial direction of the tire. The controller may be capable of controlling the amount of movement in the tire width direction and/or the rotational speed of the tire.

A nozzle 30 is attached to the tip of an extruder (not shown) and can be inserted into the inside of the tire 10. Then an adhesive sealant 20 extruded from the extruder is discharged from the tip 31 of the nozzle 30.

A non-contact displacement sensor 40 is attached to the nozzle 30 to measure the distance d between the inner periphery 11 of the tire 10 and the tip 31 of the nozzle 30.

Thus, the distance d to be measured by the non-contact displacement sensor is the distance in the radial direction of the tire between the inner periphery of the tire and the tip of the nozzle.

According to the method for producing a self-sealing tire of this embodiment, the tire 10 formed through a vulcanization step is first mounted on the rotary drive device, and the nozzle 30 is inserted into the inside of the tire 10. Then, as shown in FIGS. 1 and 2, the tire 10 is rotated and simultaneously moved in the width direction while the sealant 20 is discharged from the nozzle 30, whereby the sealant is continuously applied to the inner periphery 11 of the tire 10. The tire 10 is moved in the width direction according to the pre-entered profile of the inner periphery 11 of the tire 10.

The sealant 20 preferably has a generally string shape as described later. More specifically, the sealant preferably maintains a generally string shape when the sealant is applied to the inner periphery of the tire. In this case, the generally string-shaped sealant 20 is continuously and spirally attached to the inner periphery 11 of the tire 10.

Figure 8:
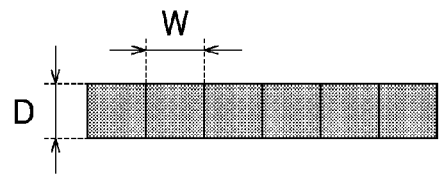
FIG. 8 is an explanatory view schematically showing an example of a cross section of the sealant shown in FIG. 4 when the sealant is cut along the straight line A-A orthogonal to the direction along which the sealant is applied (longitudinal direction).

The generally string shape as used herein refers to a shape having a certain width, a certain thickness, and a length longer than the width. FIG. 4 schematically shows an example of a generally string-shaped sealant continuously and spirally attached to the inner periphery of a tire, and FIG. 8 schematically shows an example of a cross section of the sealant shown in FIG. 4 when the sealant is cut along the straight line A-A orthogonal to the direction along which the sealant is applied (longitudinal direction). Thus, the generally string-shaped sealant has a certain width (length indicated by W in FIG. 8) and a certain thickness (length indicated by D in FIG. 8). The width of the sealant means the width of the applied sealant. The thickness of the sealant means the thickness of the applied sealant, more specifically the thickness of the sealant layer.

Specifically, the generally string-shaped sealant is a sealant having a thickness (thickness of the applied sealant or the sealant layer, length indicated by D in FIG. 8) satisfying a preferable numerical range and a width (width of the applied sealant, length indicated by W in FIG. 4 or $W_0$ in FIG. 6) satisfying a preferable numerical range as described later, and more preferably a sealant having a ratio of the thickness to the width of the sealant [(thickness of sealant)/(width of sealant)] satisfying a preferable numerical range as described later. The generally string-shaped sealant is also a sealant having a cross-sectional area satisfying a preferable numerical range as described later.

According to the method for producing a self-sealing tire of this embodiment, the sealant is applied to the inner periphery of a tire by the following Steps (1) to (3).

<Step (1)>

As shown in FIG. 2, the distance d between the inner periphery 11 of the tire 10 and the tip 31 of the nozzle 30 is measured with the non-contact displacement sensor 40 before the application of the sealant 20. The distance d is measured for every tire 10 to whose inner periphery 11 is applied the sealant 20, from the start to the end of application of the sealant 20.

<Step (2)>

The distance d data is transmitted to the controller of the rotary drive device. According to the data, the controller controls the amount of movement in the radial direction of the tire so that the distance between the inner periphery 11 of the tire 10 and the tip 31 of the nozzle 30 is adjusted to a predetermined length.

<Step (3)>

Since the sealant 20 is continuously discharged from the tip 31 of the nozzle 30, it is applied to the inner periphery 11 of the tire 10 after the above distance is adjusted. Through the above Steps (1) to (3), the sealant 20 having a uniform thickness can be applied to the inner periphery 11 of the tire 10.

Figure 3:
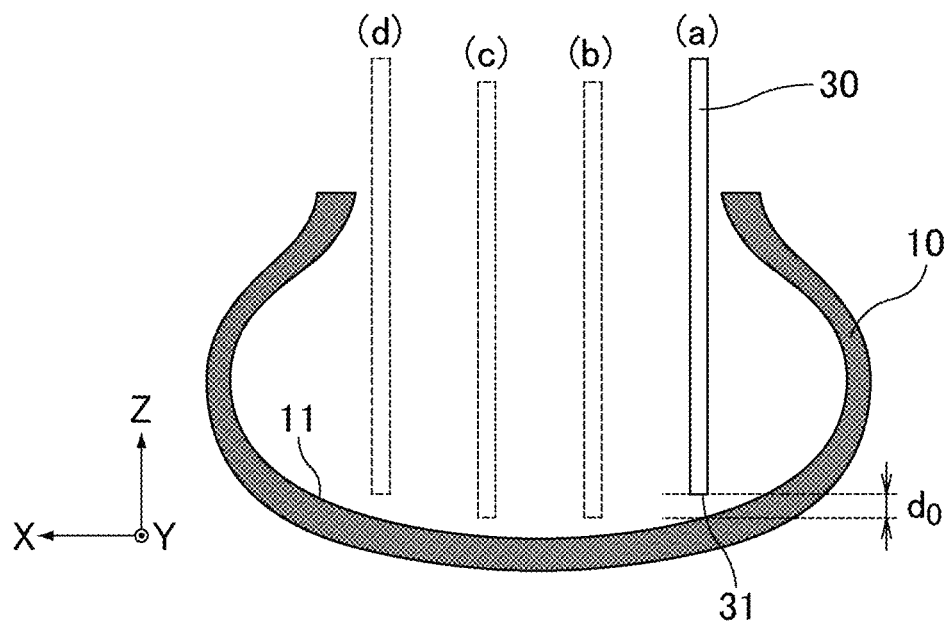
FIG. 3 is an explanatory view schematically showing the positional relationship of the nozzle to the tire.

FIG. 3 is an explanatory view schematically showing the positional relationship of the nozzle to the tire.

As shown in FIG. 3, the sealant can be applied while maintaining the distance between the inner periphery 11 of the tire 10 and the tip 31 of the nozzle 30 at a predetermined distance $d_0$ during the movement of the nozzle 30 to positions (a) to (d) relative to the tire 10.

To provide more suitable effects, the controlled distance $d_0$ is preferably 0.3 mm or more, more preferably 1.0 mm or more. If the distance is less than 0.3 mm, the tip of the nozzle is too close to the inner periphery of the tire, which makes it difficult to allow the applied sealant to have a predetermined thickness. The controlled distance $d_0$ is also preferably 3.0 mm or less, more preferably 2.0 mm or less. If the distance is more than 3.0 mm, the sealant may not be attached well to the tire, thereby resulting in reduced production efficiency.

The controlled distance $d_0$ refers to the distance in the radial direction of the tire between the inner periphery of the tire and the tip of the nozzle after the distance is controlled in Step (2).

To provide more suitable effects, the controlled distance $d_0$ is preferably 30% or less, more preferably 20% or less of the thickness of the applied sealant. The controlled distance do is also preferably 5% or more, more preferably 10% or more of the thickness of the applied sealant.

The thickness of the sealant (thickness of the applied sealant or the sealant layer, length indicated by D in FIG. 8) is not particularly limited. To provide more suitable effects, the thickness of the sealant is preferably 1.0 mm or more, more preferably 1.5 mm or more, still more preferably 2.0 mm or more, particularly preferably 2.5 mm or more. Also, the thickness of the sealant is preferably 10 mm or less, more preferably 8.0 mm or less, still more preferably 5.0 mm or less. If the thickness is less than 1.0 mm, then a puncture hole formed in the tire is difficult to reliably seal. Also, a thickness of more than 10 mm is not preferred because tire weight increases, although with little improvement in the effect of sealing puncture holes. The thickness of the sealant can be controlled by varying the rotational speed of the tire, the velocity of movement in the tire width direction, the distance between the tip of the nozzle and the inner periphery of the tire, or other factors.

The sealant preferably has a substantially constant thickness (thickness of the applied sealant or the sealant layer). In this case, the deterioration of tire uniformity can be further prevented and a self-sealing tire having much better weight balance can be produced.

The substantially constant thickness as used herein means that the thickness varies within a range of 90% to 110%, preferably 95% to 105%, more preferably 98% to 102%, still more preferably 99% to 101%.

To reduce clogging of the nozzle so that excellent operational stability can be obtained and to provide more suitable effects, a generally string-shaped sealant is preferably used and more preferably spirally attached to the inner periphery of the tire. However, a sealant not having a generally string shape may also be used and applied by spraying onto the tire inner periphery.

In the case of a generally string-shaped sealant, the width of the sealant (width of the applied sealant, length indicated by W in FIG. 4) is not particularly limited. To provide more suitable effects, the width of the sealant is preferably 0.8 mm or more, more preferably 1.3 mm or more, still more preferably 1.5 mm or more. If the width is less than 0.8 mm, the number of turns of the sealant around the tire inner periphery may increase, reducing production efficiency. The width of the sealant is also preferably 18 mm or less, more preferably 13 mm or less, still more preferably 9.0 mm or less, particularly preferably 7.0 mm or less, most preferably 6.0 mm or less, still most preferably 5.0 mm or less. If the width is more than 18 mm, a weight imbalance may be more likely to occur.

The ratio of the thickness of the sealant (thickness of the applied sealant or the sealant layer, length indicated by D in FIG. 8) to the width of the sealant (width of the applied sealant, length indicated by W in FIG. 4) [(thickness of sealant)/(width of sealant)] is preferably 0.6 to 1.4, more preferably 0.7 to 1.3, still more preferably 0.8 to 1.2, particularly preferably 0.9 to 1.1. A ratio closer to 1.0 results in a sealant having an ideal string shape, so that a self-sealing tire having high sealing performance can be produced with higher productivity.

To provide more suitable effects, the cross-sectional area of the sealant (cross-sectional area of the applied sealant, area calculated by D×W in FIG. 8) is preferably 0.8 mm$^2$ or more, more preferably 1.95 mm$^2$ or more, still more preferably 3.0 mm$^2$ or more, particularly preferably 3.75 mm$^2$ or more, but preferably 180 mm$^2$ or less, more preferably 104 mm$^2$ or less, still more preferably 45 mm$^2$ or less, particularly preferably 35 mm$^2$ or less, most preferably 25 mm$^2$ or less.

The width of the area where the sealant is attached (hereinafter also referred to as the width of the attachment area or the width of the sealant layer, and corresponding to a length equal to 6×W in FIG. 4 or a length equal to $W_1+6\times W_0$ in FIG. 6) is not particularly limited. To provide more suitable effects, the width is preferably 80% or more, more preferably 90% or more, still more preferably 100% or more, but preferably 120% or less, more preferably 110% or less, of the tread contact width.

To provide more suitable effects, the width of the sealant layer is preferably 85% to 115%, more preferably 95% to 105% of the width of the breaker of the tire (the length of the breaker in the tire width direction).

Herein, when the tire is provided with a plurality of breakers, the length of the breaker in the tire width direction refers to the length in the tire width direction of the breaker that is the longest in the tire width direction, among the plurality of breakers.

Herein, the tread contact width is determined as follows. First, a no-load and normal condition tire with a normal internal pressure mounted on a normal rim is contacted with a plane at a camber angle of 0 degrees while a normal load is applied to the tire, and then the axially outermost contact positions of the tire are each defined as "contact edge Te". The distance in the tire axis direction between the contact edges Te and Te is defined as a tread contact width TW. The dimensions and other characteristics of tire components are determined under the above normal conditions, unless otherwise stated.

The "normal rim" refers to a rim specified for each tire by standards in a standard system including standards according to which tires are provided, and may be "standard rim" in JATMA, "design rim" in TRA, or "measuring rim" in ETRTO. Moreover, the "normal internal pressure" refers to an air pressure specified for each tire by standards in a standard system including standards according to which tires are provided, and may be "maximum air pressure" in JATMA, a maximum value shown in Table "TIRE LOAD LIMITS AT VARIOUS COLD INFLATION PRESSURES" in TRA, or "inflation pressure" in ETRTO. In the case of tires for passenger vehicles, the normal internal pressure is 180 kPa.

The "normal load" refers to a load specified for each tire by standards in a standard system including standards according to which tires are provided, and may be "maximum load capacity" in JATMA, a maximum value shown in Table "TIRE LOAD LIMITS AT VARIOUS COLD INFLATION PRESSURES" in TRA, or "load capacity" in ETRTO. In the case of tires for passenger vehicles, the normal load is 88% of the above-specified load.

The rotational speed of the tire during the application of the sealant is not particularly limited. To provide more suitable effects, the rotational speed is preferably 5 m/min or higher, more preferably 10 m/min or higher, but preferably 30 m/min or lower, more preferably 20 m/min or lower. If the rotational speed is lower than 5 m/min or higher than 30 m/min, a sealant having a uniform thickness cannot be easily applied.

When a non-contact displacement sensor is used, the risk of troubles caused by adhesion of the sealant to the sensor can be reduced. The non-contact displacement sensor is not particularly limited as long as the sensor can measure the distance between the inner periphery of the tire and the tip of the nozzle. Examples include laser sensors, photosensors, and capacitance sensors. These sensors may be used alone or in combinations of two or more. For measurement of rubber, laser sensors or photosensors are preferred among these, with laser sensors being more preferred. When a laser sensor is used, the distance between the inner periphery of the tire and the tip of the nozzle can be determined as follows: the inner periphery of the tire is irradiated with a laser; the distance between the inner periphery of the tire and the tip of the laser sensor is determined based on the reflection of the laser; and the distance between the tip of the laser sensor and the tip of the nozzle is subtracted from the determined distance.

The location of the non-contact displacement sensor is not particularly limited as long as the distance between the inner periphery of the tire and the tip of the nozzle before the application of the sealant can be measured. The sensor is preferably attached to the nozzle, more preferably in a location to which the sealant will not adhere.

The number, size, and other conditions of the non-contact displacement sensor are also not particularly limited.

Since the non-contact displacement sensor is vulnerable to heat, the sensor is preferably protected with a heat insulator or the like and/or cooled with air or the like to avoid the influence of heat from the hot sealant discharged from the nozzle. This improves the durability of the sensor.

Although the first embodiment has been described based on an example in which the tire, not the nozzle, is moved in the width and radial directions of the tire, the nozzle, not the tire, may be moved, or both the tire and the nozzle may be moved.

The rotary drive device preferably includes a means to increase the width of a tire at a bead portion. In the application of the sealant to a tire, increasing the width of the tire at a bead portion allows the sealant to be easily applied to the tire. Particularly when the nozzle is introduced near the inner periphery of the tire mounted on the rotary drive device, the nozzle can be introduced only by parallel movement of the nozzle, which facilitates the control and improves productivity.

Any means that can increase the width of a tire at a bead portion can be used as the means to increase the width of a tire at a bead portion. Examples include a mechanism in which two devices each having a plurality of (preferably two) rolls which have a fixed positional relationship with each other are used and the devices move in the tire width direction. The devices may be inserted from both sides through the opening of the tire into the inside and allowed to increase the width of the tire at a bead portion.

In the production method, since the sealant which has been mixed in, for example, a twin screw kneading extruder and in which the crosslinking reaction in the extruder is suppressed is directly applied to the tire inner periphery, the crosslinking reaction begins upon the application and the sealant adheres well to the tire inner periphery and, at the same time, the crosslinking reaction more suitably proceeds, whereby a self-sealing tire having high sealing performance can be produced. Thus, the self-sealing tire with the sealant applied thereto does not need further crosslinking, thereby offering good productivity.

The self-sealing tire with the sealant applied thereto may be further subjected to a crosslinking step, if necessary.

The self-sealing tire is preferably heated in the crosslinking step. This improves the rate of crosslinking of the sealant and allows the crosslinking reaction to more suitably proceed so that the self-sealing tire can be produced with higher productivity. The tire may be heated by any method, including known methods, but it may suitably be heated in an oven. The crosslinking step may be carried out, for example, by placing the self-sealing tire in an oven at 70° C. to 190° C., preferably 150° C. to 190° C., for 2 to 15 minutes.

The tire is preferably rotated in the circumferential direction of the tire during the crosslinking because then flowing of even the just-applied, easily flowing sealant can be prevented and the crosslinking reaction can be accomplished without deterioration of uniformity. The rotational speed is preferably 300 to 1,000 rpm. Specifically, for example, an oven equipped with a rotational mechanism may be used.

Even when the crosslinking step is not additionally performed, the tire is preferably rotated in the circumferential direction of the tire until the crosslinking reaction of the sealant is completed. In this case, flowing of even the just-applied, easily flowing sealant can be prevented and the crosslinking reaction can be accomplished without deterioration of uniformity. The rotational speed is the same as described for the crosslinking step.

In order to improve the rate of crosslinking of the sealant, the tire is preferably preliminarily warmed before the application of the sealant. This allows for the production of self-sealing tires with higher productivity. The temperature for pre-heating the tire is preferably 40° C. to 100° C., more preferably 50° C. to 70° C. When the tire is pre-heated within the temperature range indicated above, the crosslinking reaction suitably begins upon the application and more suitably proceeds so that a self-sealing tire having high sealing performance can be produced. Moreover, when the tire is pre-heated within the temperature range indicated above, the crosslinking step is not necessary and thus the self-sealing tire can be produced with high productivity.

In general, continuous kneaders (especially twin screw kneading extruders) are continuously operated. In the production of self-sealing tires, however, tires need to be replaced one after another upon completion of the application of the sealant to one tire. Here, in order to produce higher quality self-sealing tires while reducing deterioration of productivity, the following method (1) or (2) may be used. The method (1) or (2) may be appropriately selected depending on the situation, in view of the following disadvantages: deterioration in quality in the method (1) and an increase in cost in the method (2).

(1) The feed of the sealant to the inner periphery of the tire is controlled by running or stopping the continuous kneader and all the feeders simultaneously.

Specifically, upon completion of the application to one tire, the continuous kneader and all the feeders may be simultaneously stopped, the tire may be replaced with another tire, preferably within one minute, and the continuous kneader and all the feeders may be simultaneously allowed to run to restart the application to the tire. By replacing tires quickly, preferably within one minute, the deterioration in quality can be reduced.

(2) The feed of the sealant to the inner periphery of the tire is controlled by switching flow channels while allowing the continuous kneader and all the feeders to keep running.

Specifically, the continuous kneader may be provided with another flow channel in addition to a nozzle for direct feeding to the tire inner periphery, and the prepared sealant may be discharged from the another flow channel after completion of the application to one tire until completion of the replacement of tires. According to this method, since self-sealing tires can be produced while the continuous kneader and all the feeders are kept running, the produced self-sealing tires can have higher quality.

Non-limiting examples of carcass cords that can be used in the carcass of the self-sealing tire described above include fiber cords and steel cords. Steel cords are preferred among these. In particular, steel cords formed of hard steel wire materials specified in JIS G 3506 are desirable. The use of strong steel cords, instead of commonly used fiber cords, as carcass cords in the self-sealing tire can greatly improve side cut resistance (resistance to cuts formed in the tire side portions due to driving over curbs or other reasons) and thereby further improve the puncture resistance of the entire tire including the side portions.

The steel cord may have any structure. Examples include steel cords having a 1×n single strand structure, steel cords having a k+m layer strand structure, steel cords having a 1×n bundle structure, and steel cords having an m×n multi-strand structure. The term "steel cord having a 1×n single strand structure" refers to a single-layered twisted steel cord prepared by intertwining n filaments. The term "steel cord having a k+m layer strand structure" refers to a steel cord having a two-layered structure in which the two layers are different from each other in twist direction and twist pitch, and the inner layer includes k filaments while the outer layer includes m filaments. The term "steel cord having a 1×n bundle structure" refers to a bundle steel cord prepared by intertwining bundles of n filaments. The term "steel cord having an m×n multi-strand structure" refers to a multi-strand steel cord prepared by intertwining m strands prepared by first twisting n filaments together. Here, n represents an integer of 1 to 27; k represents an integer of 1 to 10; and m represents an integer of 1 to 3.

The twist pitch of the steel cord is preferably 13 mm or less, more preferably 11 min or less, but preferably 5 mm or more, more preferably 7 mm or more.

The steel cord preferably contains at least one piece of preformed filament formed in the shape of a spiral. Such a preformed filament provides a relatively large gap within the steel cord to improve rubber permeability and also maintain the elongation under low load, so that a molding failure during vulcanization can be prevented.

The surface of the steel cord is preferably plated with brass, Zn, or other materials to improve initial adhesion to the rubber composition.

The steel cord preferably has an elongation of 0.5% to 1.5% under a load of 50 N. If the elongation under a load of 50 N is more than 1.5%, the reinforcing cords may show reduced elongation under high load and thus disturbance absorption may not be maintained. Conversely, if the elongation under a load of 50 N is less than 0.5%, the cords may not show sufficient elongation during vulcanization and thus a molding failure may occur. In view of the above, the elongation under a load of 50 N is more preferably 0.7% or more, but more preferably 1.3% or less.

The endcount of the steel cords is preferably 20 to 50 (ends/5 cm).

Second Embodiment

The studies of the present inventors have further revealed that the use of the method according to the first embodiment alone has the following disadvantage: a sealant having a generally string shape is occasionally difficult to attach to the inner periphery of a tire and can easily peel off especially at the attachment start portion. A second embodiment is characterized in that in the method for producing a self-sealing tire, the sealant is attached under conditions where the distance between the inner periphery of the tire and the tip of the nozzle is adjusted to a distance $d_1$ and then to a distance $d_2$ larger than the distance $d_1$. In this case, the distance between the inner periphery of the tire and the tip of the nozzle is shortened at the beginning of the attachment, so that the width of the sealant corresponding to the attachment start portion can be increased. As a result, a self-sealing tire can be easily produced in which a generally string-shaped adhesive sealant is continuously and spirally attached at least to the inner periphery of the tire that corresponds to a tread portion, and at least one of the longitudinal ends of the sealant forms a wider portion having a width larger than that of the longitudinally adjoining portion. In this self-sealing tire, a portion of the sealant that corresponds to starting of attachment has a larger width to improve adhesion of this portion so that peeling of this portion of the sealant can be prevented.

The description of the second embodiment basically includes only features different from the first embodiment, and the contents overlapping the description of the first embodiment are omitted.

Figure 5:
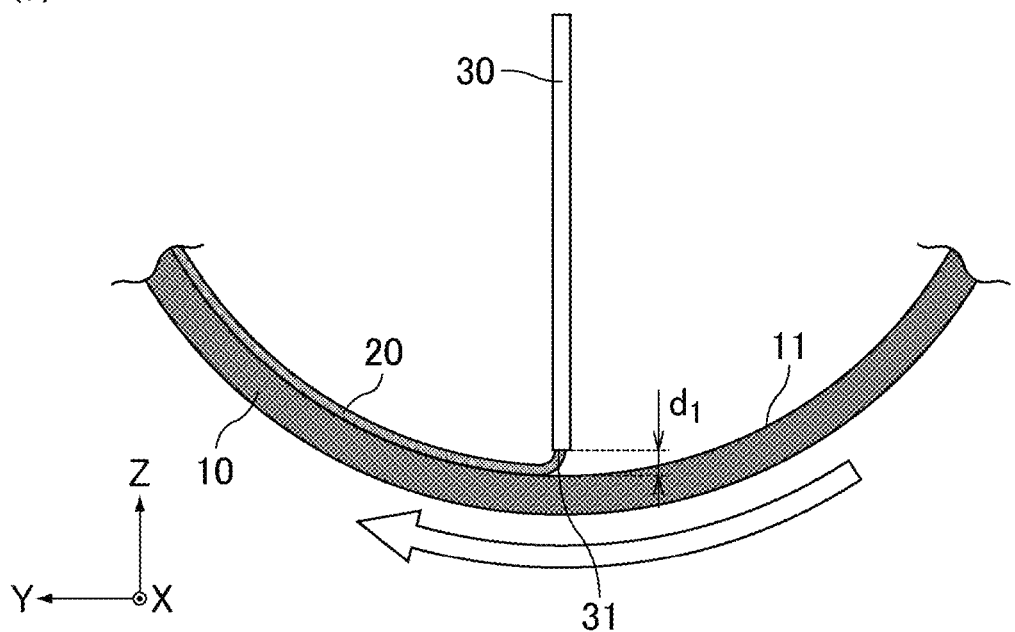
FIG. 5 are enlarged views showing the vicinity of the tip of the nozzle included in the applicator shown in FIG. 1.
Figure 5:
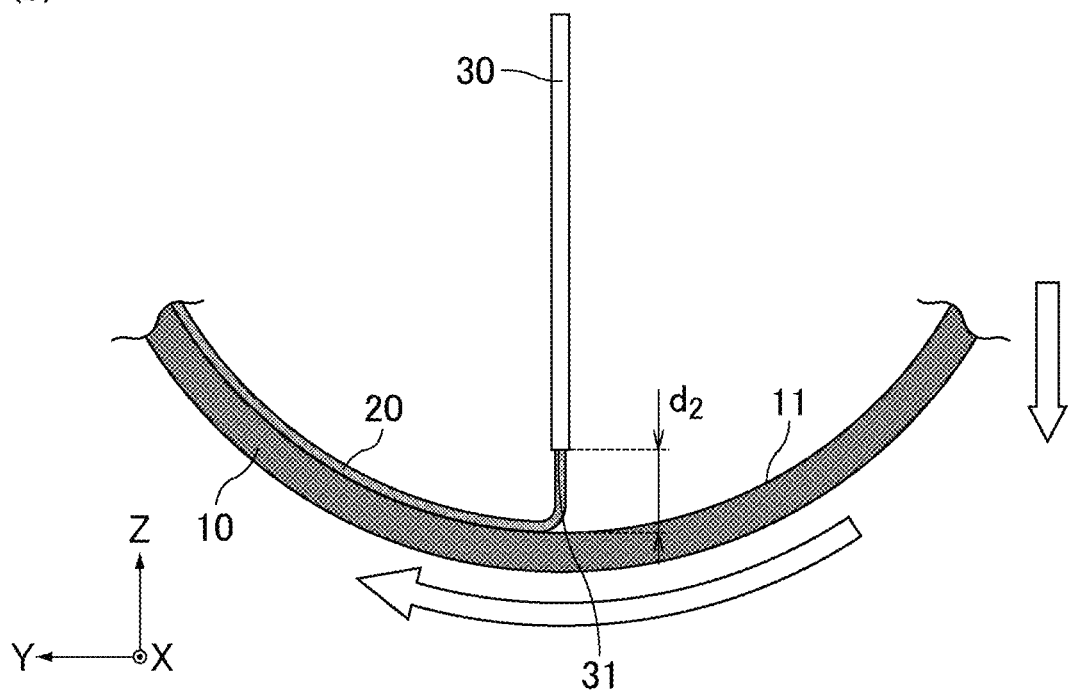

FIG. 5 are enlarged views showing the vicinity of the tip of the nozzle included in the applicator shown in FIG. 1. FIG. 5(a) illustrates a status immediately after attachment of the sealant is started and FIG. 5(b) illustrates a status after a lapse of a predetermined time.

FIG. 5 each show a cross section of a part of a tire 10 taken along a plane including the circumferential and radial directions of the tire. In FIG. 5, the width direction (axis direction) of the tire is indicated by an arrow X, the circumferential direction of the tire is indicated by an arrow Y, and the radial direction of the tire is indicated by an arrow Z.

According to the second embodiment, the tire 10 formed through a vulcanization step is first mounted on a rotary drive device, and a nozzle 30 is inserted into the inside of the tire 10. Then, as shown in FIGS. 1 and 5, the tire 10 is rotated and simultaneously moved in the width direction while a sealant 20 is discharged from the nozzle 30, whereby the sealant is continuously applied to the inner periphery 11 of the tire 10. The tire 10 is moved in the width direction according to, for example, the pre-entered profile of the inner periphery 11 of the tire 10.

Since the sealant 20 is adhesive and has a generally string shape, the sealant 20 is continuously and spirally attached to the inner periphery 11 of the tire 10 that corresponds to a tread portion.

In this process, as shown in FIG. 5(a), the sealant 20 is attached under conditions where the distance between the inner periphery 11 of the tire 10 and the tip 31 of the nozzle 30 is adjusted to a distance $d_1$ for a predetermined time from the start of the attachment. Then, after a lapse of the predetermined time, as shown in FIG. 5(b), the tire 10 is moved in the radial direction to change the distance to a distance $d_2$ larger than the distance $d_1$ and the sealant 20 is attached.

The distance may be changed from the distance $d_2$ back to the distance $d_1$ before completion of the attachment of the sealant. In view of production efficiency and tire weight balance, the distance $d_2$ is preferably maintained until the sealant attachment is completed.

Preferably, the distance $d_1$ is kept constant for a predetermined time from the start of the attachment, and after a lapse of the predetermined time the distance $d_2$ is kept constant, although the distances $d_1$ and $d_2$ are not necessarily constant as long as they satisfy the relation of $d_1 < d_2$.

The distance $d_1$ is not particularly limited. To provide more suitable effects, the distance $d_1$ is preferably 0.3 mm or more, more preferably 0.5 mm or more. If the distance $d_1$ is less than 0.3 mm, the tip of the nozzle is too close to the inner periphery of the tire, so that the sealant can easily adhere to the nozzle and the nozzle may need to be cleaned more frequently. The distance $d_1$ is also preferably 2 mm or less, more preferably 1 mm or less. If the distance $d_1$ is more than 2 mm, the effect produced by the formation of a wider portion may not be sufficient.

The distance $d_2$ is also not particularly limited. To provide more suitable effects, the distance $d_2$ is preferably 0.3 mm or more, more preferably 1 mm or more, but preferably 3 mm or less, more preferably 2 mm or less. The distance $d_2$ is preferably the same as the controlled distance $d_0$ described above.

Herein, the distances $d_1$ and $d_2$ between the inner periphery of the tire and the tip of the nozzle each refer to the distance in the radial direction of the tire between the inner periphery of the tire and the tip of the nozzle.

The rotational speed of the tire during the attachment of the sealant is not particularly limited. To provide more suitable effects, the rotational speed is preferably 5 m/min or higher, more preferably 10 m/min or higher, but preferably 30 m/min or lower, more preferably 20 m/min or lower. If the rotational speed is lower than 5 m/min or higher than 30 m/min, a sealant having a uniform thickness cannot be easily attached.

The self-sealing tire according to the second embodiment can be produced through the steps described above.

Figure 6:
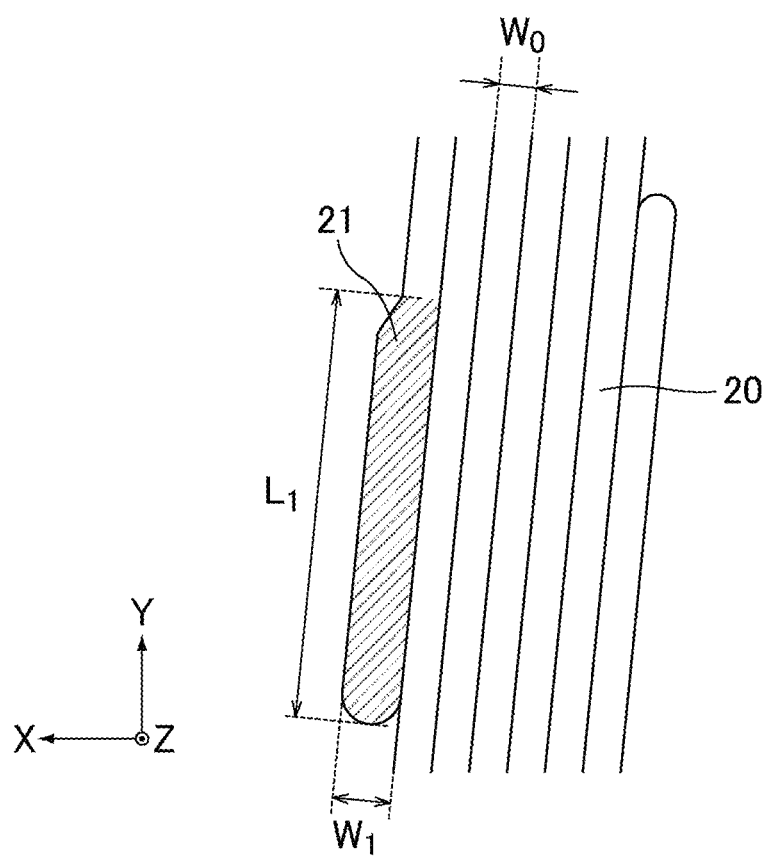
FIG. 6 is an explanatory view schematically showing an example of a sealant attached to a self-sealing tire.

FIG. 6 is an explanatory view schematically showing an example of a sealant attached to a self-sealing tire according to the second embodiment.

The generally string-shaped sealant 20 is wound in the circumferential direction of the tire and continuously and spirally attached. Here, one of the longitudinal ends of the sealant 20 forms a wider portion 21 having a width larger than that of the longitudinally adjoining portion. The wider portion 21 corresponds to the attachment start portion of the sealant.

The width of the wider portion of the sealant (width of the wider portion of the applied sealant, length indicated by $W_1$ in FIG. 6) is not particularly limited. To provide more suitable effects, the width of the wider portion is preferably 103% or more, more preferably 110% or more, still more preferably 120% or more of the width of the sealant other than the wider portion (length indicated by $W_0$ in FIG. 6). If it is less than 103%, the effect produced by the formation of a wider portion may not be sufficient. The width of the wider portion of the sealant is also preferably 210% or less, more preferably 180% or less, still more preferably 160% or less of the width of the sealant other than the wider portion. If it is more than 210%, the tip of the nozzle needs to be placed excessively close to the inner periphery of the tire to form a wider portion, with the result that the sealant can easily adhere to the nozzle and the nozzle may need to be cleaned more frequently. In addition, tire weight balance may be impaired.

The width of the wider portion of the sealant is preferably substantially constant in the longitudinal direction but may partially be substantially not constant. For example, the wider portion may have a shape in which the width is the largest at the attachment start portion and gradually decreases in the longitudinal direction. The substantially constant width as used herein means that the width varies within a range of 90% to 110%, preferably 97% to 103%, more preferably 98% to 102%, still more preferably 99% to 101%.

The length of the wider portion of the sealant (length of the wider portion of the applied sealant, length indicated by $L_1$ in FIG. 6) is not particularly limited. To provide more suitable effects, the length is preferably less than 650 mm, more preferably less than 500 mm, still more preferably less than 350 mm, particularly preferably less than 200 mm. If the length is 650 mm or more, the tip of the nozzle is placed close to the inner periphery of the tire for a longer period of time, so that the sealant can easily adhere to the nozzle and the nozzle may need to be cleaned more frequently. In addition, tire weight balance may be impaired. The sealant preferably has a shorter wider portion. However, for control of the distance between the inner periphery of the tire and the tip of the nozzle, the limit of the length of the wider portion is about 10 mm.

The width of the sealant other than the wider portion (width of the applied sealant other than the wider portion, length indicated by $W_0$ in FIG. 6) is not particularly limited. To provide more suitable effects, the width is preferably 0.8 mm or more, more preferably 1.3 mm or more, still more preferably 1.5 mm or more. If the width is less than 0.8 mm, the number of turns of the sealant around the inner periphery of the tire may increase, reducing production efficiency. The width of the sealant other than the wider portion is also preferably 18 mm or less, more preferably 13 mm or less, still more preferably 9.0 mm or less, particularly preferably 7.0 mm or less, most preferably 6.0 mm or less, still most preferably 5.0 mm or less. If the width is more than 18 mm, a weight imbalance may be more likely to occur. $W_0$ is preferably the same as the above-described W.

The width of the sealant other than the wider portion is preferably substantially constant in the longitudinal direction but may partially be substantially not constant.

The width of the area where the sealant is attached (hereinafter also referred to as the width of the attachment area or the width of the sealant layer, and corresponding to a length equal to $W_1+6\times W_0$ in FIG. 6) is not particularly limited. To provide more suitable effects, the width is preferably 80% or more, more preferably 90% or more, still more preferably 100% or more, but preferably 120% or less, more preferably 110% or less, of the tread contact width.

To provide more suitable effects, the width of the sealant layer is preferably 85% to 115%, more preferably 95% to 105% of the width of the breaker of the tire (the length of the breaker in the tire width direction).

In the self-sealing tire according to the second embodiment, the sealant is preferably attached without overlapping in the width direction and more preferably without gaps.

In the self-sealing tire according to the second embodiment, the other longitudinal end (the end corresponding to the attachment ending portion) of the sealant may also form a wider portion having a width larger than that of the longitudinally adjoining portion.

The thickness of the sealant (thickness of the applied sealant or the sealant layer, length indicated by D in FIG. 8) is not particularly limited. To provide more suitable effects, the thickness of the sealant is preferably 1.0 mm or more, more preferably 1.5 mm or more, still more preferably 2.0 mm or more, particularly preferably 2.5 mm or more, but preferably 10 mm or less, more preferably 8.0 mm or less, still more preferably 5.0 mm or less. If the thickness is less than 1.0 mm, then a puncture hole formed in the tire is difficult to reliably seal. Also, a thickness of more than 10 mm is not preferred because tire weight increases, although with little improvement in the effect of sealing puncture holes.

The sealant preferably has a substantially constant thickness (thickness of the applied sealant or the sealant layer). In this case, the deterioration of tire uniformity can be further prevented and a self-sealing tire having much better weight balance can be produced.

The ratio of the thickness of the sealant (thickness of the applied sealant or the sealant layer, length indicated by D in FIG. 8) to the width of the sealant other than the wider portion (width of the applied sealant other than the wider portion, length indicated by $W_0$ in FIG. 6) [(thickness of sealant)/(width of sealant other than wider portion)] is preferably 0.6 to 1.4, more preferably 0.7 to 1.3, still more preferably 0.8 to 1.2, particularly preferably 0.9 to 1.1. A ratio closer to 1.0 results in a sealant having an ideal string shape, so that a self-sealing tire having high sealing performance can be produced with higher productivity.

To provide more suitable effects, the cross-sectional area of the sealant (cross-sectional area of the applied sealant, area calculated by D×W in FIG. 8) is preferably 0.8 mm² or more, more preferably 1.95 mm² or more, still more preferably 3.0 mm² or more, particularly preferably 3.75 mm² or more, but preferably 180 mm² or less, more preferably 104 mm² or less, still more preferably 45 mm² or less, particularly preferably 35 mm² or less, most preferably 25 mm² or less.

According to the second embodiment, even when the sealant has a viscosity within the range indicated earlier, and particularly a relatively high viscosity, widening a portion of the sealant that corresponds to starting of attachment can improve adhesion of this portion so that peeling of this portion of the sealant can be prevented.

The self-sealing tire according to the second embodiment is preferably produced as described above. However, the self-sealing tire may be produced by any other appropriate method as long as at least one of the ends of the sealant is allowed to form a wider portion.

Although the above descriptions, and particularly the description of the first embodiment, explain the case where a non-contact displacement sensor is used in applying the sealant to the inner periphery of the tire, the sealant may be applied to the inner periphery of the tire while controlling the movement of the nozzle and/or the tire according to the pre-entered coordinate data, without measurement using a non-contact displacement sensor.

Self-sealing tires including a sealant layer located radially inside an innerliner can be produced as described above or by other methods. In particular, the sealant layer is preferably formed by applying a sealant to the inner periphery of a vulcanized tire because of advantages such as that problems caused by flowing of the sealant or other reasons are less likely to occur and that this method can be responsive to changes in tire size by programming. For easy handling of the sealant and high productivity, the sealant layer is also preferably formed by sequentially preparing a sealant by mixing raw materials including a crosslinking agent using a continuous kneader, and sequentially applying the sealant to the inner periphery of a tire.

According to the present invention, after the production of a self-sealing tire including a sealant layer located radially inside an innerliner as described above or by other methods, in other words, after a sealant layer is formed radially inside an innerliner of a tire by the step of continuously and spirally applying a generally string-shaped sealant to the inner periphery of a vulcanized tire, the further step is performed of attaching a resonator including a tube with an opening, and a cavity connected to the tube after the application of the sealant.

<Step of Attaching a Resonator>

In the step of attaching a resonator, a resonator is attached and located radially inside the sealant layer formed radially inside the innerliner of the tire.

(First Pneumatic Tire)

In the case of the first pneumatic tire including a resonator whose opening is provided to face the inside of the tire, a resonator can be attached and located radially inside the sealant layer in the tire while allowing the opening of the resonator to face the inside of the tire.

As the sealant forming the sealant layer in the first pneumatic tire is adhesive, by bringing a resonator into contact with the sealant layer, the resonator can be easily provided radially inside the sealant layer in the tire while adhering well to it. Moreover, in spite of utilizing the adhesiveness, the deterioration of sealing performance can be prevented so that the tire can maintain the sealing performance.

The step of attaching a resonator for the first pneumatic tire may be carried out by bringing an appropriately selected sound-absorbing resonator into contact with the adhesive sealant layer. The resonator is attached to the inner periphery of the tire. Particularly in view of sound-absorbing properties, practical utility, and other properties, the resonator is preferably attached to the tire inner periphery corresponding to a tread portion.

The resonator used in the first pneumatic tire may be a Helmholtz-type resonator including a tube with an opening, and a cavity (sub air chamber) connected to the tube. When the opening of the resonator is provided to face the inside of the tire, the vibrational energy of sound waves is converted to thermal energy due to the flow friction in the tube and the reflection of intake sound in the cavity, whereby the cavity resonance (road noise) in the tire can be absorbed.

Figure 10:
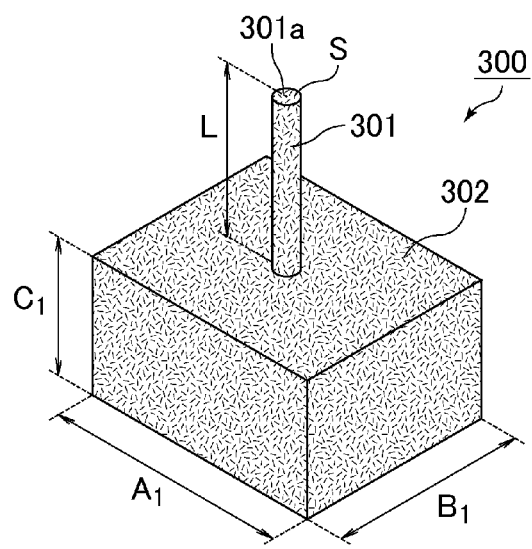
FIG. 10 is an explanatory view schematically showing an example of a resonator.

The sound-absorbing resonator may be, for example, an embodiment as shown in the schematic view of FIG. 10. The resonator 300 in FIG. 10 includes a tube 301 with a length L having an opening 301a with an opening area S, and also includes a rectangular parallelepiped cavity 302 with an inner width $A_1$, an inner length $B_1$, and an inner height $C_1$ (volume of cavity $V=A_1 \times B_1 \times C_1$) which communicates with and is connected to the tube 301.

The sound-absorbing effect for tire cavity resonance is specifically described. Tire cavity resonance can be reduced by controlling (tuning) the tube 301 so that the resonator 300 has a resonant frequency that is equal or substantially equal to the frequency of the tire cavity resonance.

The resonant frequency $f_0$ of the cavity can be determined by the equation below. If necessary, an open end correction may be applied to the length L (m) of the tube and other parameters.

$$f_0 = \frac{C}{2\pi}\sqrt{\frac{S}{LV}}$$

Cross-sectional area of tube (area of opening): S ($m^2$)
Length of tube: L (m)
Volume (capacity) of cavity: V ($m^3$)
Sound velocity: C (m/s)

Then, tire cavity resonance can be reduced by controlling (tuning) the cross-sectional area (the area of the opening of the tube 110) and the length of the tube so that the resonator 100 has a resonant frequency that is equal or substantially equal to the tire cavity resonance according to the above equation.

In the case of the first pneumatic tire, tire cavity resonance can be reduced by using a resonator tuned (controlled) to 130 to 330 Hz, preferably 180 to 280 Hz.

The size, number, and wall thickness of the resonator in the first pneumatic tire may be appropriately selected depending on the size of the tire, sound-absorbing effect, and other factors. With regard to the number of resonators, for example, since the use of a large resonator can cause imbalance, it is desirable to use a plurality of small resonators. The use of a larger number (total number) of resonators tends to lead to a greater reduction in tire cavity resonance, and the number is preferably 4 or more, more preferably 12 or more, still more preferably 24 or more.

In the first pneumatic tire, the resonator is preferably deformed and/or broken upon puncture with a nail or other foreign bodies. If a resonator formed of a high strength material is used to prevent the damage by a nail, upon puncture with a nail, the sealant adheres to the resonator and peels off, thereby resulting in deterioration of air-sealing properties. In contrast, if a resonator is deformed and/or broken upon puncture, the sealant layer will not be affected by the deformation and/or breakage so that the deterioration of air-sealing properties can be reduced. Although the sound-absorbing effect is lost by the deformation and/or breakage of the resonator, the desired noise reduction effect can also be achieved by provision of a plurality of resonators. The expression "the resonator is deformed and/or broken" herein means that a change occurs in the original adhesion (attachment) of the resonator, such as: the resonator is broken by a nail or the like; the resonator is separated from the adhesive (attachment) surface of the sealant layer; or the position of the resonator provided is moved. A deformable resonator may be produced from, for example, a lightweight material with excellent strength and heat resistance such as polypropylene, cardboard, corrugated cardboard, or nonwoven fabric.

The resonator in the first pneumatic tire may suitably be, for example, one in which the cavity of the resonator has no bottom surface, but the surface of a sealant layer is provided as a substitute for the bottom surface. For example, in the case where the resonator 300 in FIG. 10 has no bottom surface, specifically, where the resonator has no bottom surface defined by the width $A_1$ and length $B_1$, the side with no bottom surface is adhered (attached) to a sealant layer. This prevents the sealant layer from peeling off when the resonator is separated off upon puncture with a nail, thereby leading to good air-sealing properties. Furthermore, such a resonator can be easily produced. The bottom surface of the cavity herein refers to the surface of the cavity on the side facing the tube and is, in FIG. 10, defined by the width $A_1$ and length $B_1$.

In the first pneumatic tire, preferably resonators are circumferentially provided at substantially equally spaced intervals. Also preferably, resonators tuned (controlled) to the same frequency are provided circumferentially symmetrically about the axis of the tire. In view of uniformity and prevention of imbalance, it is desirable to place resonators at substantially equally spaced intervals or to symmetrically place resonators of the same type. As a result, not only can the effect of reducing resonance be achieved, but also vibration can be sufficiently suppressed.

Figure 11:
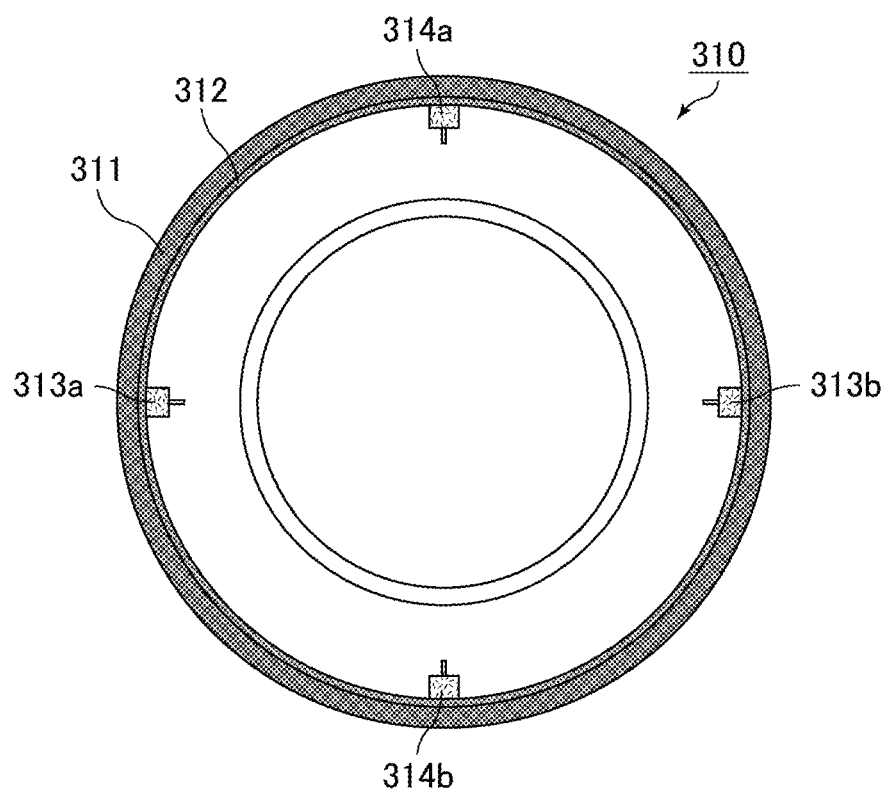
FIG. 11 is an exemplary schematic view showing resonators provided radially inside in a tire.

FIG. 11 is a schematic view (circumferential cross-sectional view of the tire) of a self-sealing tire as a suitable example of the first pneumatic tire including a resonator whose opening is provided to face the inside of the tire. In the self-sealing tire, resonators are circumferentially provided at substantially equally spaced intervals, and the resonators tuned to the same frequency are provided circumferentially symmetrically about the axis of the tire.

The self-sealing tire 310 shown in FIG. 11 includes a sealant layer 312 formed radially inside an innerliner in a tire component 311 (including the innerliner). Resonators 313a and 313b tuned to the same frequency (for example 220 Hz) and resonators 314a and 314b tuned to the same frequency (for example 220 Hz) are also provided on the inner periphery of the sealant layer 312. The opening of each resonator is provided to face the inside of the tire. Moreover, the resonators are provided symmetrically about the axis (not shown, the center part of the figure) of the tire, and the resonators are provided at substantially equally spaced intervals (¼ in the tire circumferential direction). With such a structure, not only can the effect of reducing tire cavity resonance be sufficiently achieved, but also vibration can be prevented. Although FIG. 11 shows an exemplary embodiment in which the sealant layer 312 is formed, the same effect can be obtained in a first pneumatic tire in which an adhesive layer that can adhere to the resonators 314a and 314b is formed in place of the sealant layer 312.

Figure 12:
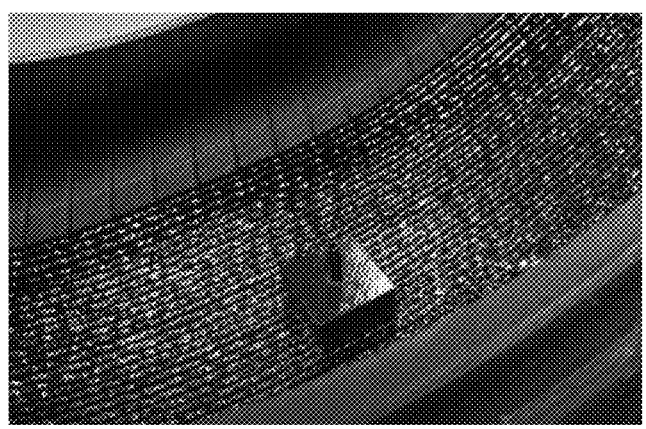
FIG. 12 is a photograph of a resonator provided radially inside in a tire.

FIG. 12 is an exemplary photograph of a resonator attached to the inner periphery of a sealant layer as an example of the first pneumatic tire including a resonator whose opening is provided to face the inside of the tire.

(Second Pneumatic Tire)

In the case of the second pneumatic tire including a resonator whose opening is provided to penetrate outside of the tire, a resonator can be attached and located radially inside the sealant layer in the tire while allowing the opening of the resonator to penetrate from the radially inner side of the sealant layer to the outside of the tire.

As the sealant forming the sealant layer in the second pneumatic tire is adhesive, by bringing a resonator into contact with the sealant layer, the resonator can be easily provided radially inside the sealant layer in the tire while adhering well to it. Moreover, leakage of the air in the tire through the opening can be prevented due to the close attachment achieved by virtue of the adhesiveness, whereby the retention of the air in the tire can be maintained. It is also possible to retain the air even upon puncture because the nail does not interfere with the resonator and the sealant exhibits sealing performance.

The step of attaching a resonator for the second pneumatic tire can be carried out as in the case of the first pneumatic tire by bringing an appropriately selected sound-absorbing resonator into contact with an adhesive sealant layer. The resonator is attached to the inner periphery of the tire. Particularly in view of sound-absorbing properties, practical utility, and other properties, the resonator is preferably attached to the tire inner periphery corresponding to a tread portion.

The resonator in the second pneumatic tire may be a Helmholtz-type resonator including a tube with an opening, and a cavity (sub air chamber) connected to the tube as in the case of the first pneumatic tire. When the opening of the resonator is provided to penetrate outside of the tire, the vibrational energy of sound waves is converted to thermal energy due to the flow friction in the tube and the reflection of intake sound in the cavity, whereby the air column resonance (pattern noise) in the tire grooves can be absorbed.

Examples of the sound-absorbing resonator include those mentioned for the first pneumatic tire. The air column resonance in the tire grooves can be reduced by the control (tuning) as described above.

In the case of the second pneumatic tire, the air column resonance in the tire grooves can be reduced by using a resonator tuned (controlled) to 500 Hz to 2 kHz.

The size, number, and wall thickness of the resonator in the second pneumatic tire may be appropriately selected depending on the size of the tire, sound-absorbing effect, and other factors. With regard to the number of resonators, for example, since the use of a large resonator can cause imbalance, it is desirable to use a plurality of small resonators. The use of a larger number (total number) of resonators tends to lead to a greater reduction in the air column resonance in the tire grooves, and the number is preferably 50 or more, more preferably 300 or more, still more preferably 400 or more.

In the second pneumatic tire, the resonator may be deformed and/or broken upon puncture with a nail or other foreign bodies as in the first pneumatic tire.

Examples of the resonator in the first pneumatic tire include, in addition to the conventional resonators as shown in, for example, FIG. 10, resonators in which a tube is provided separately from a cavity having no upper surface. For example, in the case where the resonator 300 in FIG. 10 has no upper surface (surface bonding to the tube), specifically, where the resonator has no upper surface defined by the width $A_1$ and length $B_1$ which bonds to the tube, the tube is placed to penetrate outside of the tire while the side with no upper surface is adhered (attached) to a sealant layer. This ensures air-sealing properties and air retention properties. Furthermore, such a resonator can be easily produced.

Like the first pneumatic tire, the second pneumatic tire may an embodiment in which resonators are circumferentially provided at substantially equally spaced intervals or an embodiment in which resonators tuned (controlled) to the same frequency are provided circumferentially symmetrically about the axis of the tire.

As described above, FIG. 11 shows an example of the first pneumatic tire including a resonator whose opening is provided to face the inside of the tire. The second pneumatic tire may be the same embodiment, except that the opening of the resonator is provided to penetrate outside of the tire (not shown).

Figure 13:
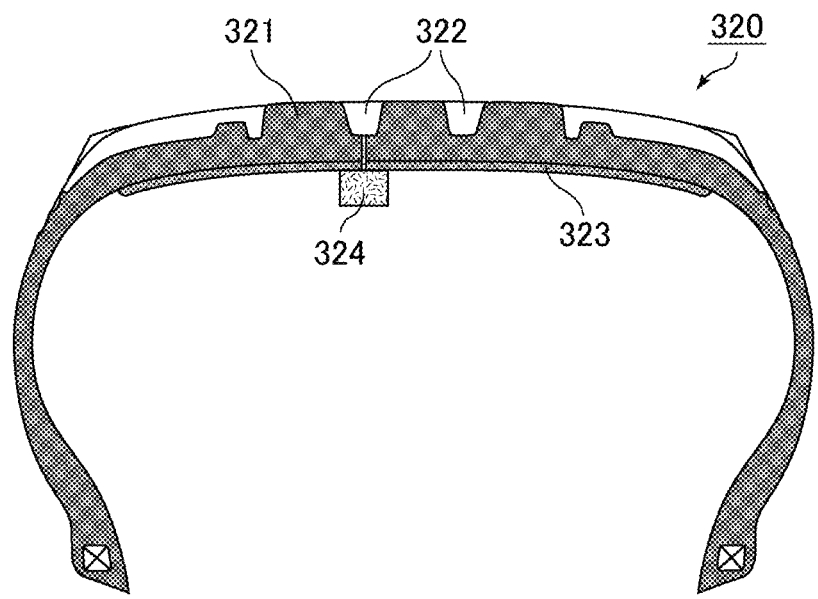
FIG. 13 is a schematic view showing an example of a resonator provided to penetrate a circumferential longitudinal groove of a tire.
Figure 14:
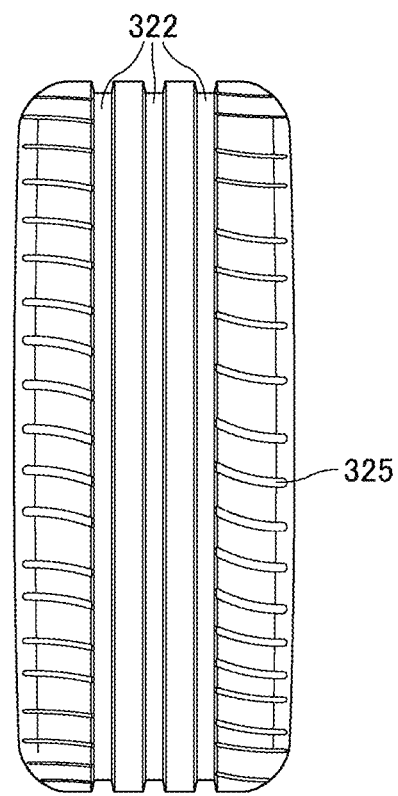
FIG. 14 is an exemplary schematic view showing longitudinal grooves and lateral grooves of a tire.

FIG. 13 is a cross-sectional view in the meridional direction of a part of a tire including a resonator whose opening is provided to penetrate a circumferential longitudinal groove of the tire as an example of the second pneumatic tire including a resonator whose opening is provided to penetrate outside of the tire. FIG. 14 is a schematic view of a tire showing circumferential longitudinal grooves and lateral grooves of the tire.

In the self-sealing tire 320 shown in FIG. 13, circumferential longitudinal grooves 322 are formed on the surface of a tread 321 in a tread portion. A tuned resonator 324 is also provided on the inner periphery of a sealant layer 323. The opening of the resonator 324 is provided to penetrate the surface of the circumferential longitudinal groove 322 of the tire. With such a structure, the effect of reducing the air column resonance in the tire longitudinal grooves can be significantly achieved. Although the penetration may cause air leakage, the resonator can be closely attached by taking advantage of the adhesiveness of the sealant, and leakage of the air in the tire through the opening can be prevented due to the close attachment achieved by virtue of the adhesiveness, whereby the retention of the air in the tire can be maintained. It is also possible to retain the air even upon puncture because the sealant exhibits sealing performance. Practical utility can also be ensured.

Although FIG. 13 shows an example in which the resonator is provided at the longitudinal groove 322, a resonator may be provided at a lateral groove 325 in FIG. 14. In this case, the resonance in the lateral grooves can be reduced.

EXAMPLES

The present invention is specifically described with reference to, but not limited to, examples below.

The chemicals used in the examples are listed below.

Butyl rubber A: Regular butyl 065 (available from Japan Butyl Co., Ltd., Mooney viscosity $ML_{1+8}$ at 125° C.: 32)

Liquid polymer A: Nisseki polybutene HV300 (available from JX Nippon Oil & Energy Corporation, kinematic viscosity at 40° C.: 26,000 mm$^2$/s, kinematic viscosity at 100° C.: 590 mm$^2$/s, number average molecular weight: 1,400)

Liquid polymer B: Nisseki polybutene HV1900 (available from JX Nippon Oil & Energy Corporation, kinematic viscosity at 40° C.: 160,000 mm$^2$/s, kinematic viscosity at 100° C.: 3,710 mm$^2$/s, number average molecular weight: 2,900)

Plasticizer: DOP (dioctyl phthalate, available from Showa Chemical, specific gravity: 0.96, viscosity: 81 mPa·s)

Carbon black: N330 (available from Cabot Japan K.K., HAF grade, DBP oil absorption: 102 ml/100 g)

Crosslinking activator: VULNOC GM (available from Ouchi Shinko Chemical Industrial Co., Ltd., p-benzoquinone dioxime)

Crosslinking agent: NYPER NS (available from NOF Corporation, dibenzoyl peroxide (40% dilution, dibenzoyl peroxide: 40%, dibutyl phthalate: 48%), the amount shown in Table 1 is the net benzoyl peroxide content)

According to the formulation shown in Table 1, the chemicals were introduced into a twin screw kneading extruder as follows: the butyl rubber A, carbon black, and crosslinking activator were introduced from the upstream supply port; the liquid polymer B was introduced from the midstream supply port; and the liquid polymer A, plasticizer, and crosslinking agent were introduced from the downstream supply port. They were kneaded at 200 rpm at a barrel temperature of 100° C. to prepare a sealant. The liquid polymers were heated to 50° C. before the introduction from the supply ports.

(Time for Kneading Materials)

Time for mixing butyl rubber A, carbon black, and crosslinking activator: 2 minutes Time for mixing liquid polymer B: 2 minutes Time for mixing liquid polymer A, plasticizer, and crosslinking agent: 1.5 minutes

TABLE 1

|  |  | Sealant |
|---|---|---|
| Formulation amount (parts by mass) | Butyl rubber A ($ML_{1+8}$ at 125° C.: 32) | 100 |
|  | Liquid polymer A (Kinematic viscosity at 100° C.: 590) | 100 |
|  | Liquid polymer B (Kinematic viscosity at 100° C.: 3710) | 100 |
|  | Plasticizer (DOP) | 10 |
|  | Carbon black (N330) | 10 |
|  | Crosslinking activator (p-benzoquinone dioxime) | 10 |
|  | Crosslinking agent (Dibenzoyl peroxide) | 10 |

[Second Pneumatic Tire]

Examples 1 to 3

<Production of Self-Sealing Tire>

The sealant (at 100° C.) sequentially prepared as above was extruded from the twin screw kneading extruder through the nozzle and continuously and spirally attached (spirally applied) as shown in FIGS. 1 to 4 to the inner periphery of a tire (215/55R17, 94W, rim: 17×8J, cross-sectional area of cavity of tire mounted on rim: 194 cm², vulcanized, rotational speed of tire: 12 m/min, pre-heating temperature: 40° C., width of tire breaker: 180 mm) mounted on a rotary drive device to allow the sealant (viscosity at 40° C.: 10,000 Pa·s, generally string shape, thickness: 3 mm, width: 4 mm) to form a sealant layer with a thickness of 3 mm and a width of the attachment area of 180 mm. Further, resonators each having the shape (with an upper surface) and the tuned frequency indicated in Table 2 were placed radially inside the sealant layer formed in the tire by taking advantage of the adhesiveness of the sealant, while allowing the opening (end) of each resonator to penetrate the tire groove (see FIG. 13), under the conditions shown in Table 3, including the number of longitudinal tread grooves in the tire, location (longitudinal or lateral tread grooves), number (the number of resonators in each groove), total number (the total number of resonators), details of number (the number for each tuned frequency), arrangement in the tread circumferential direction (arranged at equally spaced intervals or without gaps; symmetry or asymmetry about the tire axis; putting together the same type), and material (polypropylene, iron). Accordingly, second self-sealing tires were prepared.

The width of the sealant was controlled to be substantially constant in the longitudinal direction. The viscosity of the sealant was measured at 40° C. in conformity with JIS K 6833 using a rotational viscometer.

Examples 4 to 12

<Production of Tire (with No Sealant Layer)>

Tires (second pneumatic tires with no sealant layer) were prepared as in Example 1, except that no sealant layer was formed, and the resonators were manually placed on the inner surface of the innerliner under the conditions indicated in Table 3.

Comparative Example 1

A regular tire (pneumatic tire) including no sealant layer and no resonator was used.

The self-sealing tires and tires prepared as above underwent the following evaluations.

<Pattern Noise-Reducing Properties (subjective Noise Test)>

The self-sealing tires or tires (215/55R17, 94W, rim: 17×8J, tire inner peripheral length: 1, 999 mm, initial internal pressure: 230 kPa, ambient temperature: 25° C.) were mounted on all the wheels of a front-engine, front-wheel-drive vehicle of 2,000 cc displacement made in Japan. The "SHAH" noise during driving of the vehicle at 100 km/h was subjectively evaluated by a driver and expressed as an index, with Comparative Example 1 (regular tire) set equal to 100.

A higher index indicates better pattern noise-reducing properties.

<Generation of Vibration (Vibration Test)>

In the subjective noise test, the driver subjectively evaluated vibration during driving at 120 km/h.

<Air Retention Test>

The self-sealing tire or tire mounted on a rim was allowed to stand at 25° C. for seven days. Then, the internal pressure of the tire was measured and expressed as an index, with Comparative Example 1 (regular tire) set equal to 100. A higher index indicates better air retention properties.

<Puncture-Repairing Properties (Sealing Performance)>

Ten nails (round nails according to JIS N100, shank diameter: 4.2 mm) were completely driven into a longitudinal groove of the self-sealing tire and then immediately removed. After the tire was allowed to stand for a whole day, the internal pressure of the tire was measured. The residual internal pressure (index of air leakage) is expressed as an index, with Example 2 set equal to 100. A higher index indicates better puncture-repairing properties (sealing performance).

TABLE 2

| | | Resonator | | | | |
|---|---|---|---|---|---|---|
| | | Frequency (Hz) | | | | |
| | | 400 | 500 | 1000 | 1999 | 3998 |
| Size (inner diameter)/cm | $A_1$ (width) | 12 | 10 | 6 | 4 | 2.5 |
| | $B_1$ (length) | 12 | 10 | 6 | 4 | 2.5 |
| | $C_1$ (height) | 9.9 | 9.1 | 6.3 | 3.6 | 2.3 |
| | D (Diameter of opening area S) | 1 | 1 | 1 | 1 | 1 |
| | L (Tube length) | 9 | 9 | 9 | 9 | 9 |

TABLE 3

| | | Comparative Example 1 | Example 1 | Example 2 | Example 3 | Example 4 | Example 5 | Example 6 |
|---|---|---|---|---|---|---|---|---|
| Resonator | Location | Absent | Longitudinal groove abcd | Longitudinal groove abcd | Longitudinal groove abcd | Lateral groove | Longitudinal groove b | Longitudinal groove abcd |
| | Number of longitudinal grooves | 0 | 4 | 4 | 4 | — | 1 | 4 |
| | Number | 0 | 120 | 120 | (120) | — | 50 | 120 |
| | Total number | 0 | 480 | 480 | 475 | 100 | 50 | 480 |
| | Details of number  400 Hz | — | — | — | — | — | — | — |
| | 500 Hz | — | 160 | 160 | 158 | — | — | — |
| | 1 kHz | — | 160 | 160 | 159 | 100 | 50 | 480 |
| | 2 kHz | — | 160 | 160 | 158 | — | — | — |
| | 4 kHz | — | — | — | — | — | — | — |
| | Arrangement in tread circumferential direction | — | Equal intervals Symmetry | Equal intervals Symmetry | Equal intervals Symmetry | Equal intervals Symmetry | Equal intervals Symmetry | Equal intervals Symmetry |
| | Material | — | Iron | PP | PP | Iron | Iron | Iron |
| Sealant (with/without) | | without | with | with | with | without | without | without |
| Subjective noise ("SHAH" noise) | | 100 | 120 | 120 | 120 | 102 | 104 | 115 |
| Generation of vibration | | No | Yes | Yes | Yes | No | No | No |
| Air retention properties | | 100 | 100 | 100 | 100 | 99 | 99 | 98 |
| Puncture-repairing properties | | — | 90 | 100 | 100 | — | — | — |

| | | Example 7 | Example 8 | Example 9 | Example 10 | Example 11 | Example 12 |
|---|---|---|---|---|---|---|---|
| Resonator | Location | Longitudinal groove abcd | Longitudinal groove abcd | Longitudinal groove abcd | Longitudinal groove abcd | Longitudinal groove abcd | Longitudinal groove abcd |
| | Number of longitudinal grooves | 4 | 4 | 4 | 4 | 4 | 4 |
| | Number | 120 | 120 | 120 | 120 | 120 | 120 |
| | Total number | 480 | 480 | 480 | 480 | 480 | 480 |
| | Details of number  400 Hz | — | — | 120 | — | — | — |
| | 500 Hz | 240 | 160 | 120 | 120 | 160 | 160 |
| | 1 kHz | 240 | 160 | 120 | 120 | 160 | 160 |
| | 2 kHz | — | 160 | 120 | 120 | 160 | 160 |
| | 4 kHz | — | — | — | 120 | — | — |
| | Arrangement in tread circumferential direction | Equal intervals Symmetry | Equal intervals Symmetry | Equal intervals Symmetry | Equal intervals Symmetry | Arranged without gaps Asymmetry | Equal intervals Putting together the same type |
| | Material | Iron | Iron | Iron | Iron | Iron | Iron |
| Sealant (with/without) | | without | without | without | without | without | without |
| Subjective noise ("SHAH" noise) | | 116 | 120 | 113 | 112 | 120 | 120 |
| Generation of vibration | | No | No | No | No | Yes | Yes |
| Air retention properties | | 98 | 98 | 98 | 98 | 98 | 98 |
| Puncture-repairing properties | | — | — | — | — | — | — |

One longitudinal groove (b): Resonators were provided at one longitudinal groove b.
Four longitudinal grooves (a, b, c, d): Resonators were provided evenly at four longitudinal grooves a, b, c, and d.
Lateral groove: Resonators were provided at lateral grooves.
Examples 2 and 3 were evaluated after removing nails (Five resonators were broken.)

The self-sealing tires of Examples 1 to 3 (second pneumatic tires) including resonators exhibited sufficiently reduced pattern noise and excellent air retention properties. In these examples, slight vibrations were felt, but the vibration levels were practically acceptable. The puncture-repairing properties of the tire of Example 1 using an iron material were slightly low, but were practically acceptable.

The tires (with no sealant layer) of Examples 4 to 12 exhibited sufficiently reduced pattern noise and excellent air retention properties. In some of these examples, slight vibrations were felt, but the vibration levels were practically acceptable.

[First pneumatic tire]

Examples 21 to 23

<Production of Self-Sealing Tire>

First self-sealing tires were prepared as in Example 1, except that resonators each having the shape (with a bottom surface) and the tuned frequency indicated in Table 4, instead of Tables 2 and 3, were placed by taking advantage of the adhesiveness of the sealant, while allowing the opening of each resonator to face the inside of the tire (see FIG. 11), under the conditions shown in Table 5, including location (inner equatorial plane), number (the total number of resonators), arrangement in the tread circumferential direction (at equally spaced intervals, symmetry about the tire axis), and material (polypropylene, iron).

The self-sealing tires prepared as above underwent the following evaluations.

<Cavity Resonance-Reducing Properties (Subjective Noise test)>

The self-sealing tires (215/55R17, 94W, rim: 17×8J, tire inner peripheral length: 1,999 mm, initial internal pressure: 230 kPa, ambient temperature: 25° C.) were mounted on all the wheels of a front-engine, front-wheel-drive vehicle of 2,000 cc displacement made in Japan. The tire cavity resonance (road noise) during driving of the vehicle at 100 km/h was subjective evaluated by a driver and expressed as an index, with Comparative Example 1 (regular tire) set equal to 100. A higher index indicates better cavity resonance-reducing properties.

<Generation of Vibration (Vibration Test)>

The generation of vibration was evaluated as described above.

<Air Retention Test>

Air retention properties were evaluated as described above.

<Puncture-Repairing Properties (Sealing Performance)>

Puncture-repairing properties (sealing performance) were evaluated as described above.

TABLE 4

| | Resonator | |
|---|---|---|
| | | Frequency (Hz) |
| | | 220 |
| Size (inner diameter)/cm | $A_1$ (width) | 3.2 |
| | $B_1$ (length) | 3.2 |
| | $C_1$ (height) | 3.0 |
| | D (Diameter of opening area S) | 0.5 |
| | L (Tube length) | 3.5 |

TABLE 5

| | | First tire | | |
|---|---|---|---|---|
| | | Example 21 | Example 22 | Example 23 |
| Resonator | Location | Inner equatorial plane One row | Inner equatorial plane One row | Inner equatorial plane One row |
| | Number (Total number, 220 Hz) | 50 | 10 | 4 |
| | Arrangement in tread circumferential direction | Equal intervals | Equal intervals | Equal intervals |
| | | Symmetry | Symmetry | Symmetry |
| | Material | PP | PP | PP |
| Sealant (with/without) | | with | with | with |
| Subjective noise (Cavity resonance) | | 130 | 110 | 103 |
| Generation of vibration | | No | No | No |
| Air retention properties | | 100 | 100 | 100 |
| Puncture-repairing properties | | 100 | 100 | 100 |

The self-sealing tires of Examples 21 to 23 (first pneumatic tires) including resonators exhibited sufficiently reduced tire cavity resonance (road noise). They also had excellent air retention properties and excellent puncture-repairing properties without generating vibration.

REFERENCE SIGNS LIST

10 Tire
11 Inner periphery of tire
14 Tread portion
15 Carcass
16 Breaker
17 Band
20 Sealant
21 Wider portion
30 Nozzle
31 Tip of nozzle
40 Non-contact displacement sensor
50 Rotary drive device
60 Twin screw kneading extruder
61 (61a, 61b, 61c) Supply port
62 Material feeder
d, $d_0$, $d_1$, $d_2$ Distance between inner periphery of tire and tip of nozzle
300 Resonator
301 Tube
301a Opening
302 Cavity
310, 320 Self-sealing tire
311 Tire component (including innerliner)
312, 323 Sealant layer
313a, 313b Resonators tuned to the same frequency
314a, 314b Resonators tuned to the same frequency
321 Tread
322 Circumferential longitudinal groove
324 Resonator
325 Lateral groove

The invention claimed is:

1. A pneumatic tire, comprising at least one resonator on an inner periphery of the pneumatic tire, each resonator comprising a tube with an opening, and a cavity connected to the tube,
   wherein the pneumatic tire further comprises a tread portion and each resonator faces the tread portion, the tread portion comprises at least one circumferential longitudinal groove, and the opening is provided to penetrate one of the at least one circumferential longitudinal groove of the tread portion.

2. The pneumatic tire according to claim 1, wherein each resonator is a Helmholtz-type resonator.

3. The pneumatic tire according to claim 1, wherein the at least one resonator is multiple resonators tuned to different frequencies.

4. The pneumatic tire according to claim 1, wherein the at least one resonator is multiple resonators circumferentially provided at substantially equally spaced intervals.

5. The pneumatic tire according to claim 1, wherein the at least one resonator is multiple resonators tuned to the same frequency, and the multiple resonators are provided circumferentially symmetrically about an axis of the pneumatic tire.

6. The pneumatic tire according to claim 1, wherein the pneumatic tire comprises a sealant layer located on the inner periphery of the pneumatic tire, and the at least one resonator is on the sealant layer;
   the sealant layer is formed by continuously and spirally applying a generally string-shaped sealant to the inner periphery of the pneumatic tire; and
   the at least one resonator is attached to the inner periphery of the pneumatic tire through the sealant layer.

7. The pneumatic tire according to claim 6,
wherein the generally string-shaped sealant comprises a rubber component including a butyl-based rubber, a liquid polymer, and an organic peroxide,
the generally string-shaped sealant comprises 1 to 30 parts by mass of an inorganic filler relative to 100 parts by mass of the rubber component,
the pneumatic tire includes a tread intended to contact a road surface, at least one breaker located radially inside the tread, and a carcass radially inside the at least one breaker, and
the sealant layer has a thickness of 1.0 to 10.0 mm and a width of 85% to 115% of a greatest width breaker, in a tire width direction, of the at least one breaker of the pneumatic tire.

8. The pneumatic tire according to claim 1,
wherein the pneumatic tire comprises a sealant layer located on the inner periphery of the pneumatic tire, and the at least one resonator is on the sealant layer and is attached to the inner periphery of the pneumatic tire through the sealant layer, and
wherein the sealant layer is formed by sequentially preparing a sealant by mixing raw materials including a crosslinking agent using a continuous kneader, and sequentially applying the sealant to the inner periphery of the pneumatic tire.

9. A method for producing the pneumatic tire according to claim 1, the method comprising the step of attaching the at least one resonator on the inner periphery of the pneumatic tire facing the tread portion of the pneumatic tire and the step of providing the tube opening of each of the at least one resonator penetrating a corresponding one of the at least one circumferential longitudinal groove of the tread portion.

10. The method according to claim 9,
wherein the method further comprises the steps of:
forming a sealant layer by continuously and spirally applying a generally string-shaped sealant to the inner periphery of the pneumatic tire;
providing the at least one resonator on the sealant layer; and
attaching the at least one resonator to the inner periphery of the pneumatic tire through the sealant layer after the application of the generally string-shaped sealant.

* * * * *